(12) United States Patent
Nejad et al.

(10) Patent No.: US 7,577,171 B2
(45) Date of Patent: Aug. 18, 2009

(54) SOURCE CENTERED CLOCK SUPPORTING QUAD 10 GBPS SERIAL INTERFACE

(75) Inventors: Mohammad Nejad, Newport Beach, CA (US); Guangming Yin, Foothill Ranch, CA (US); Ali Ghiasi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1013 days.

(21) Appl. No.: 10/361,463

(22) Filed: Feb. 10, 2003

(65) Prior Publication Data
US 2004/0028075 A1 Feb. 12, 2004

Related U.S. Application Data

(60) Provisional application No. 60/401,735, filed on Aug. 6, 2002.

(51) Int. Cl.
*H04J 3/02* (2006.01)
(52) U.S. Cl. .......................... 370/539; 370/463; 370/537
(58) Field of Classification Search ................. 370/464, 370/465, 468, 532–537, 539, 541, 542
See application file for complete search history.

(56) References Cited

U.S. PATENT DOCUMENTS

| | | | | |
|---|---|---|---|---|
| 5,490,282 A | * | 2/1996 | Dreps et al. ..................... | 710/1 |
| 6,667,519 B2 | * | 12/2003 | Farwell et al. ............... | 257/369 |
| 6,674,772 B1 | * | 1/2004 | Dally et al. .................. | 370/539 |
| 7,039,067 B2 | * | 5/2006 | Feinberg et al. ............. | 370/468 |
| 7,106,761 B2 | * | 9/2006 | Shiota et al. ................. | 370/537 |
| 2002/0051468 A1 | * | 5/2002 | Ofek et al. ................... | 370/503 |
| 2003/0043434 A1 | * | 3/2003 | Brachmann et al. ......... | 359/158 |
| 2005/0229049 A1 | * | 10/2005 | Collins ........................ | 714/699 |

* cited by examiner

*Primary Examiner*—Jayanti K Patel
*Assistant Examiner*—Saba Tsegaye
(74) *Attorney, Agent, or Firm*—Garlick Harrison & Markison; Bruce E. Garlick; Kevin L. Smith

(57) ABSTRACT

A multiple bit stream interface interfaces a first transmit data multiplexing integrated circuit and a second transmit data multiplexing integrated circuit. The multiple bit stream interface includes an interface plurality of transmit bit streams each of which carries a respective bit stream at an interface bit rate. The interface further includes a transmit data clock operating at a frequency corresponding to one-half of the interface bit rate. The first transmit data multiplexing integrated circuit receives a first plurality of transmit bit streams from a communication ASIC at a first bit rate. The second transmit data multiplexing integrated circuit produces a single bit stream output at a line bit rate. The interface plurality of transmit bit streams is divided into a first group and a second group, wherein the first group is carried on first group of lines and the second group is carried on a second group of lines. The transmit data clock is carried on a line that is centered with respect to the first group of lines and the second group of lines such that it resides between the first group of lines and the second group of lines. The interface may also interface a first receive data demultiplexing integrated circuit and a second receive data demultiplexing integrated circuit.

50 Claims, 23 Drawing Sheets

Transmitter Output and Clock Specifications

| Parameter | Symbol | Conditions | Min | Typ | Max | Units |
|---|---|---|---|---|---|---|
| Output Common Mode | Vcm | See Figure Below | 1760 | 1675 | 1790 | mV |
| Single Ended Output Impedance | $Z_{SE}$ | | 40 | 50 | 60 | Ω |
| Differential Output Impedance | $Z_d$ | | 80 | 100 | 120 | Ω |
| Output Impedance Match | $Z_M$ | | | | 10 | % |
| Q40, CML output Amplitude, Differential, p-p | ΔVQDO | See Figure Below | 410 | 500 | 590 | mV |
| Q40, Output Rise and Fall time (20% to 80%) | $t_{RH}, t_{FH}$ | | | 25 | 35 | ps |
| Differential output return loss * | S22 | Up to 7.5 GHz | 10 | | | dB |
| Single Ended output return loss | S22 | Up to 7.5 GHz | 6 | | | dB |
| * 4-by-1 de-mux Output Return Loss >15 dB at 7.5 GHz. | | | | | | |

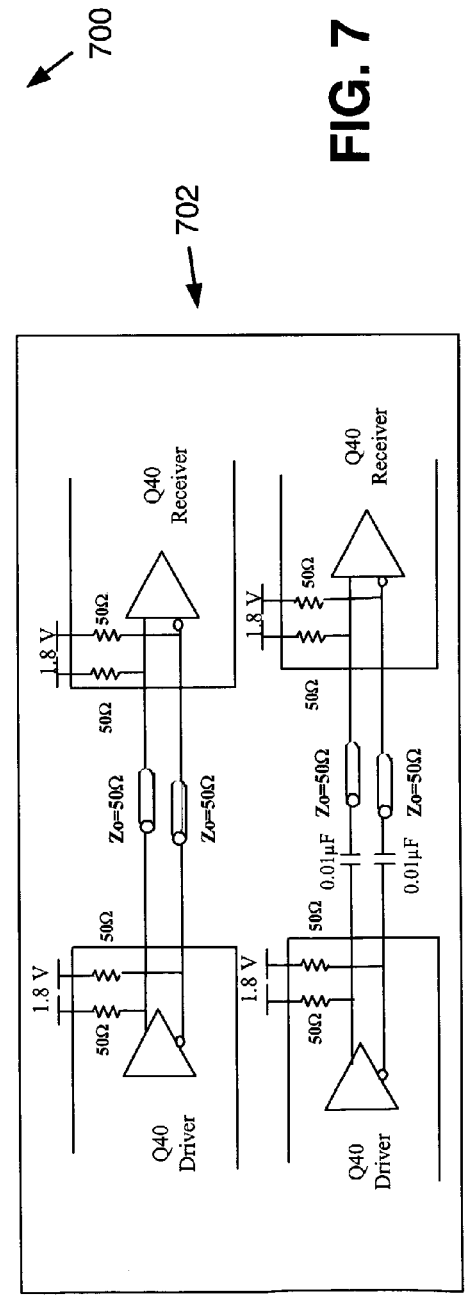

FIG. 7

Receiver Input and Source Centered Clock Performance

| Parameter | Symbol | Conditions | Min | Typ | Max | Units |
|---|---|---|---|---|---|---|
| Output Common Mode | Vcm | See Figure Below | 1575 | 1675 | 1775 | mV |
| Single Ended Output Impedance | $Z_{SE}$ | | 40 | 50 | 60 | Ω |
| Differential Input impedance | $Z_d$ | | 80 | 100 | 120 | Ω |
| Input Impedance Mismatch | $Z_M$ | | | | 10 | % |
| Q40, CML Input Differential Amplitude, p-p | Δ VQDO | See Figure Below | 400 | 500 | 600 | mV |
| Q40 Input Rise and Fall Time (20% to 80%) | $t_{RH}, t_{FH}$ | | | 25 | | ps |
| Differential output return loss* | S11 | Up to 7.5 GHz | 10 | | 35 | dB |
| 4-by-1 mux input return loss >15 db at 10 GHz | | | | | | |

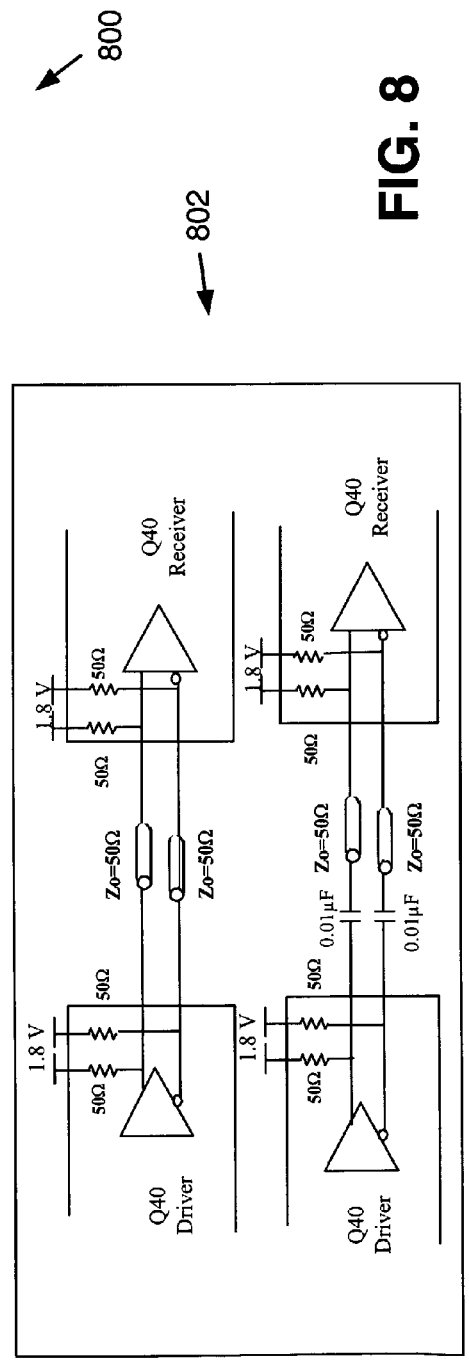

FIG. 8

SOURCE CENTERED CLOCK SUPPORTING QUAD 10 GBPS SERIAL INTERFACE

CROSS REFERENCE TO RELATED APPLICATION

This application claims priority to U.S. Provisional Application Serial No. 60/401,735, filed Aug. 6, 2002, which is incorporated herein by reference in its entirety for all purposes.

BACKGROUND OF THE INVENTION

1. Technical Field of the Invention

The present invention relates generally to communication systems; and more particularly to high-speed serial bit stream communications.

2. Description of Related Art

The structure and operation of communication systems is generally well known. Communication systems support the transfer of information from one location to another location. Early examples of communication systems included the telegraph and the public switch telephone network (PSTN). When initially constructed, the PSTN was a circuit switched network that supported only analog voice communications. As the PSTN advanced in its structure and operation, it supported digital communications. The Internet is a more recently developed communication system that supports digital communications. As contrasted to the PSTN, the Internet is a packet switch network.

The Internet consists of a plurality of switch hubs and digital communication lines that interconnect the switch hubs. Many of the digital communication lines of the Internet are serviced via fiber optic cables (media). Fiber optic media supports high-speed communications and provides substantial bandwidth, as compared to copper media. At the switch hubs, switching equipment is used to switch data communications between digital communication lines. WANs, Internet service providers (ISPs), and various other networks access the Internet at these switch hubs. This structure is not unique to the Internet, however. Portions of the PSTN, wireless cellular network infrastructure, Wide Area Networks (WANs), and other communication systems also employ this same structure.

The switch hubs employ switches to route incoming traffic and outgoing traffic. A typical switch located at a switch hub includes a housing having a plurality of slots that are designed to receive Printed Circuit Boards (PCBs) upon which integrated circuits and various media connectors are mounted. The PCBs removably mount within the racks of the housing and typically communicate with one another via a back plane of the housing. Each PCB typically includes at least two media connectors that couple the PCB to a pair of optical cables and/or copper media. The optical and/or copper media serves to couple the PCB to other PCBs located in the same geographic area or to other PCBs located at another geographic area.

For example, a switch that services a building in a large city couples via fiber media to switches mounted in other buildings within the city and switches located in other cities and even in other countries. Typically, Application Specific Integrated Circuits (ASICs) mounted upon the PCBs of the housing. These ASICs perform switching operations for the data that is received on the coupled media and transmitted on the coupled media. The coupled media typically terminates in a receptacle and transceiving circuitry coupled thereto performs signal conversion operations. In most installations, the media, e.g., optical media, operates in a simplex fashion. In such case, one optical media carries incoming data (RX data) to the PCB while another optical media carries outgoing data (TX data) from the PCB. Thus, the transceiving circuitry typically includes incoming circuitry and outgoing circuitry, each of which couples to a media connector on a first side and communicatively couples to the ASIC on a second side. The ASIC may also couple to a back plane interface that allows the ASIC to communicate with other ASICs located in the enclosure via a back plane connection. The ASIC is designed and implemented to provide desired switching operations. The operation of such enclosures and the PCBs mounted therein is generally known.

The conversion of information from the optical media or copper media to a signal that may be received by the ASIC and vice versa requires satisfaction of a number of requirements. First, the coupled physical media has particular RX signal requirements and TX signal requirements. These requirements must be met at the boundary of the connector to the physical media. Further, the ASIC has its own unique RX and TX signal requirements. These requirements must be met at the ASIC interface. Thus, the transceiving circuit that resides between the physical media and the ASIC must satisfy all of these requirements.

Various standardized interfaces have been employed to couple the transceiving circuit to the ASIC. These standardized interfaces include the XAUI interface, the Xenpak interface, the GBIC interface, the XGMII interface, and the SFI-5 interface, among others. The SFI-5 interface, for example, includes 16 data lines, each of which supports a serial bit stream having a nominal bit rate of 2.5 Giga bits-per-second (GBPS). Line interfaces also have their own operational characteristics. Particular high-speed line interfaces are the OC-768 interface and the SEL-768 interface. Each of these interfaces provides a high-speed serial interface operating at a nominal bit rate of 40 GBPS.

Particular difficulties arise in converting data between the 40×1 GBPS line interface and the 16×12.5 GBPS communication ASIC interface. In particular, operation on the 40 GBPS side requires the ability to switch data at a very high bit rate, e.g., exceeding the bit rate possible with a CMOS integrated circuit formed of Silicon. While other materials, e.g., Indium-Phosphate and Silicon-Germanium provide higher switching rates than do Silicon based devices, they are very expensive and difficult to manufacture. Further, the functional requirements of interfacing the 40×1 GBPS line interface and the 16×12.5 GBPS communication ASIC interface are substantial. Thus, even if a device were manufactured that could perform such interfacing operations, the effective yield in an Indium-Phosphate or Silicon-Germanium process would be very low.

Thus, there is a need in the art for low cost and high speed interface that couples a high-speed line side interface to a communication ASIC.

BRIEF SUMMARY OF THE INVENTION

In order to overcome the above-described shortcomings of the prior devices, among other shortcomings, a multiple bit stream interface interfaces a first transmit data multiplexing integrated circuit and a second transmit data multiplexing integrated circuit. The multiple bit stream interface includes an interface plurality of transmit bit streams each of which carries a respective bit stream at an interface bit rate. The interface further includes a transmit data clock operating at a frequency corresponding to one-half of the interface bit rate. The first transmit data multiplexing integrated circuit receives a first plurality of transmit bit streams from a communication ASIC at a first bit rate. The second transmit data multiplexing integrated circuit produces a single bit stream output at a line bit rate. The interface plurality of transmit bit streams is divided into a first group and a second group, wherein the first group is carried on first group of lines and the second group is carried on a second group of lines. The transmit data clock is carried on a line that is centered with respect to the first group of lines and the second group of lines such that it resides between the first group of lines and the second group of lines.

In one embodiment, the first plurality of transmit bit streams includes sixteen bit streams and the interface plurality of transmit bit streams includes four bit streams. In one operation, the first bit rate may is nominally 2.5 Giga Bits per Second (GBPS), the interface bit rate is be nominally 10 GBPS, and the line bit rate is nominally 40 GBPS. The second transmit data multiplexing integrated circuit may produce the single bit stream to a communicatively coupled fiber optic media.

The interface may be mounded upon a Printed Circuit Board (PCB). In such case, the first transmit data multiplexing integrated circuit, the second transmit data multiplexing integrated circuit, the interface plurality of transmit bit streams, and the transmit data clock each reside upon the PCB. In one particular construction, the first transmit data multiplexing integrated circuit is a silicon Complementary Metal Oxide Semiconductor (CMOS) based integrated circuit while the second transmit data multiplexing integrated circuit is one of an Indium-Phosphate based integrated circuit or a Silicon-Germanium based integrated circuit. In such case, the first transmit data multiplexing integrated circuit may operate at a lower clock rate than the second transmit data multiplexing integrated circuit.

The interface plurality of transmit bit streams of the interface may include substantially synchronized transition times and substantially synchronized valid data times. In such case, the transmit data clock transitions from low to high during a substantially synchronized valid data time of the plurality of transmit bit streams. Further, the transmit data clock transitions from high to low during an immediately following substantially synchronized valid data time.

In various embodiments, the single bit stream output at the line bit rate may conform to the OC-768 operating standard or to the SEL-768 operating standard. Further, the first plurality of transmit bit streams at the first bit rate may conform to the SFI-5 operating standard.

The multiple bit stream interface may also include a loss of lock signal that is asserted by the second transmit data multiplexing integrated circuit to the first transmit data multiplexing integrated circuit when the second transmit data multiplexing integrated circuit loses lock. In such case, the first transmit data multiplexing integrated circuit is the master of the multiple bit stream interface when the loss of lock signal is not asserted while the second transmit data multiplexing integrated circuit is the master of the multiple bit stream interface when the loss of lock signal is asserted.

In some embodiments, the transmit data clock is provided by the first transmit data multiplexing integrated circuit. In these embodiment, a second transmit data clock may be provided by the second data multiplexing integrated circuit that operates at a frequency corresponding to one-half of the interface bit rate. In one particular embodiment, the transmit data clock has a nominal frequency of 5 GHz and the interface bit rate is 10 Giga Bits per Second (GBPS).

Similar operations are supported by a multiple bit stream interface that interfaces a first receive data demultiplexing integrated circuit and a second receive data demultiplexing integrated circuit. This multiple bit stream interface includes an interface plurality of receive bit streams each of which carries a respective bit stream at an interface bit rate and a receive data clock operating at a frequency corresponding to one-half of the interface bit rate. The first receive data demultiplexing integrated circuit produces a first plurality of receive bit streams at a first bit rate. The second receive data demultiplexing integrated circuit receives a single bit stream input at a line bit rate. The interface plurality of receive bit streams is divided into a first group and a second group, wherein the first group is carried on first group of lines and the second group is carried on a second group of lines. Further, the receive data clock is carried on a line that is centered with respect to the first group of lines and the second group of lines such that it resides between the first group of lines and the second group of lines. This interface may include the various characteristics further described above.

Other features and advantages of the present invention will become apparent from the following detailed description of the invention made with reference to the accompanying drawings.

BRIEF DESCRIPTION OF THE SEVERAL VIEWS OF THE DRAWINGS

These and other features, aspects and advantages of the present invention will be more fully understood when considered with respect to the following detailed description, appended claims and accompanying drawings wherein:

FIG. 7 includes a table and a diagram that illustrate operating specifications for the TX interface between the TX data multiplexing integrated circuits of FIG. 3;

FIG. 8 includes a table and a diagram that illustrate operating specifications for the RX interface between the RX data demultiplexing integrated circuits of FIG. 3;

DETAILED DESCRIPTION OF THE INVENTION

Figure 1:
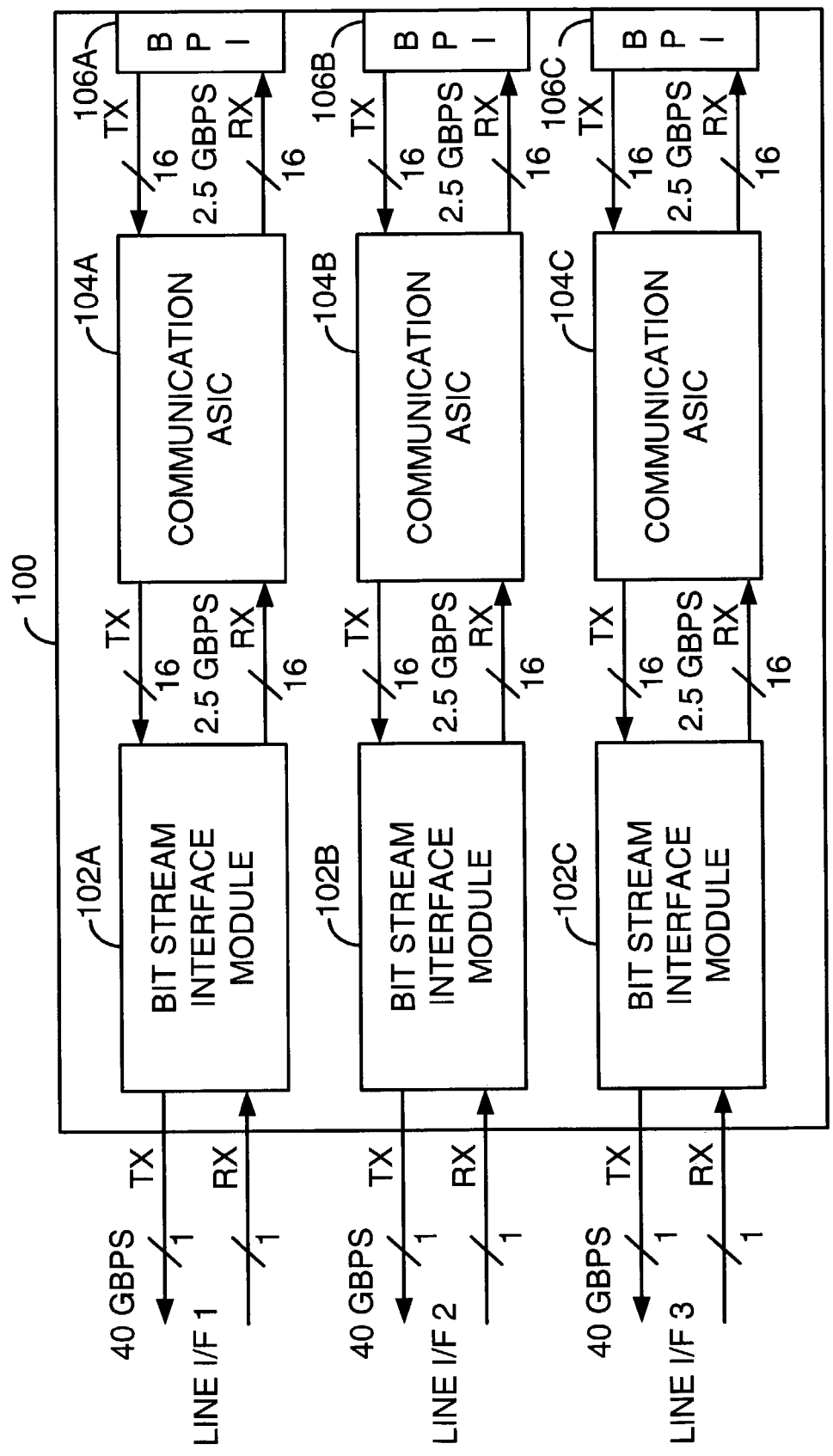
FIG. 1 is a block diagram illustrating a Printed Circuit Board (PCB) that has mounted thereon a plurality of Bit Stream Interface Module (BSIMs) constructed according to the present invention.

FIG. 1 is a block diagram illustrating a Printed Circuit Board (PCB) that has mounted thereon a plurality of Bit Stream Interface Module (BSIMs) constructed according to the present invention. As shown in FIG. 1, the PCB 100 includes BSIMs 102A, 102B and 102C. The PCB 100 also includes mounted thereupon communication Application Specific Integrated Circuits (ASIC) 104A, 104B, and 104C. The PCB 100 is mounted within a housing that services switching requirements within a particular location or geographic area. Each of the BSIMs 102A, 102B, and 102C couples to a high-speed media such as an optical fiber via a respective media interface and supports the OC-768 or the SEC-768 standard at such media interface. On the second side of the BSIMs 102A through 102C, the SFI-5 interface standard is supported. Communication ASIC 104A through 104C may communicate with other PCB components located in the housing via back interfaces 106A through 106C.

The BSIMs 102A through 102C may be removably mounted upon the PCB 100. In such case, if one of the BSIMs 102A through 102C fails it may be removed and replaced without disrupting operation of other devices on the PCB 100. When the BSIMs 102-102C are removably mounted upon the PCB 100, they are received by a socket or connection coupled to the PCB 100. Further, in such embodiment, the BSIMs 102A-102C may be constructed on a separate PCB.

Figure 2A:
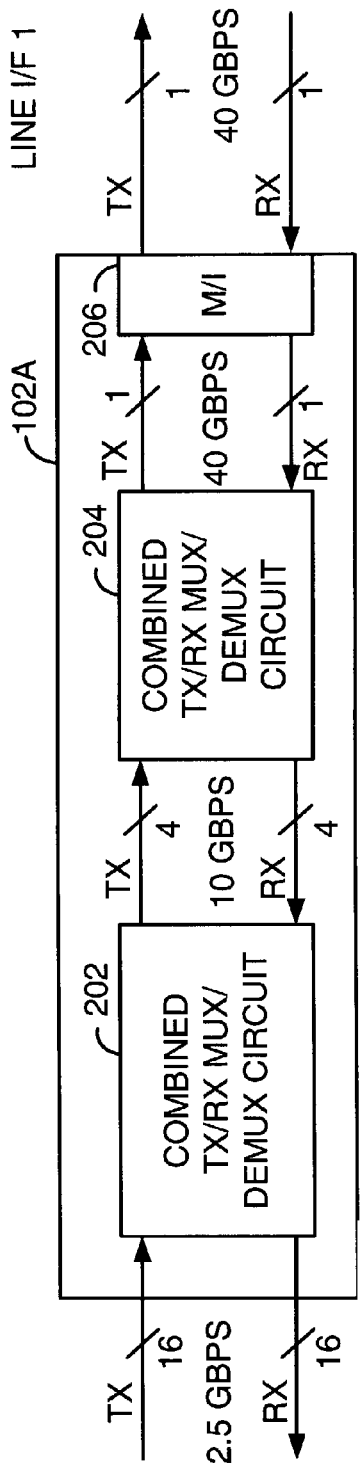
FIG. 2A is a block diagram illustrating one embodiment of a BSIM constructed according to the present invention.

FIG. 2A is a block diagram illustrating one embodiment of a BSIM 102A constructed according to the present invention. The BSIM 102A of FIG. 2A includes a first combined TX/RX multiplexing/demultiplexing integrated circuit 202 and a second combined TX/RX multiplexing/demultiplexing integrated circuit 204. On the line side of the BSIM 102A, the first combined TX/RX multiplexing/demultiplexing integrated circuit 204 couples to a media, e.g., fiber optic cable or copper cable, via a media interface 206. The media interface 206 couples to the combined TX/RX multiplexing/demultiplexing integrated circuit 204 via a 40 GPS nominal bit rate, one bit transmit and one bit receive interface. The TX and RX line medias themselves each support one bit 40 Giga bits-per-second (GBPS) nominal bit rate communications, such as is defined by the OC-768 and/or SEC 768 specifications of the OIF.

The combined TX/RX multiplexing/demultiplexing integrated circuit 202 interfaces with a communication ASIC, e.g. 104A, via 16 TX bit lines and 16 RX bit lines, each operating at a nominal bit rate of 2.5 GBPS. Such interface supports a nominal total throughput of 40 GBPS (16*2.5 GBPS). The interface between the combined TX/RX multiplexing/demultiplexing integrated circuit 202 and the combined TX/RX multiplexing/demultiplexing integrated circuit 204 includes 4 TX bit lines and 4 RX bit lines, each operating at a nominal rate of 10 GBPS. This interface supports a nominal total throughput of 40 GBPS (4*10 GBPS). This interface may operate substantially or fully in accordance with an operating standard known as the Q40 operating standard. However, the teachings of the present invention are not limited to according to operation of the Q40 standard or is the description here intended to be a complete description of the Q40 standard itself.

Figure 2B:
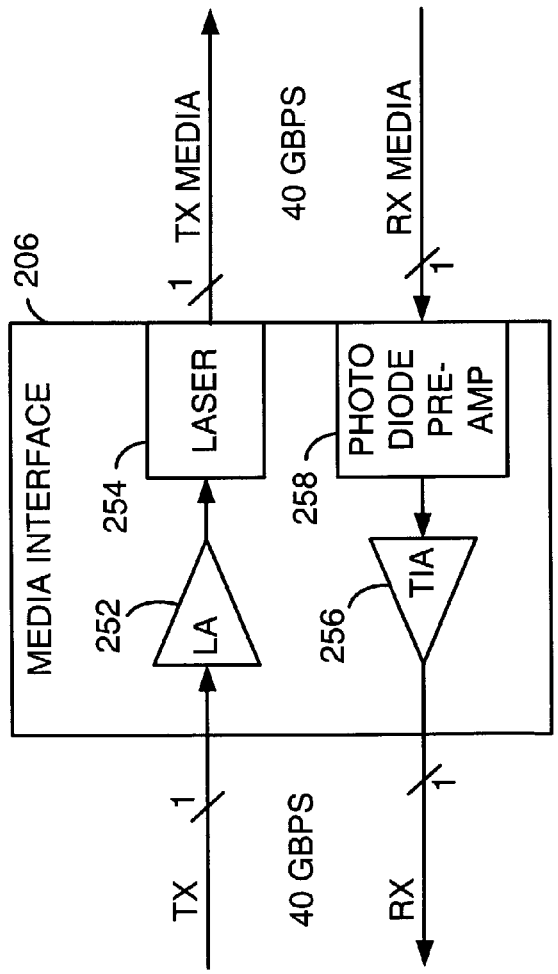
FIG. 2B is a block diagram illustrating an optical media interface that may be included wit the BSIM of FIG. 2A.

FIG. 2B is a block diagram illustrating an optical media interface that may be included with the BSIM of FIG. 2A. As shown in FIG. 2B, media interface 206 couples to an optical media on a first side and couples to the combined TX/RX multiplexing/demultiplexing integrated circuit 204 on a second side. In the transmit path, the media interface 206 receives a single bit stream at a nominal bit rate of 40 GBPS from the combined TX/RX multiplexing/demultiplexing integrated circuit 204. The TX bit stream is amplified by limiting amplifier 252 to produce a bit stream output that is coupled to laser 254. The laser produces an optical signal that is coupled to TX optical media.

On the receive side, an RX optical media produces the RX bit stream at a nominal bit rate of 40 GBPS. The RX bit stream is received by a photo diode/pre-amplifier combination 258. The photo diode/pre-amplifier combination 258 produces an output that is received by a transimpedance amplifier 256. The output of the transimpedance amplifier 256 is a single bit stream at a nominal bit rate of 40 GBPS that is provided to the combined TX/RX multiplexing/demultiplexing integrated circuit 204 of FIG. 2A.

Figure 3:
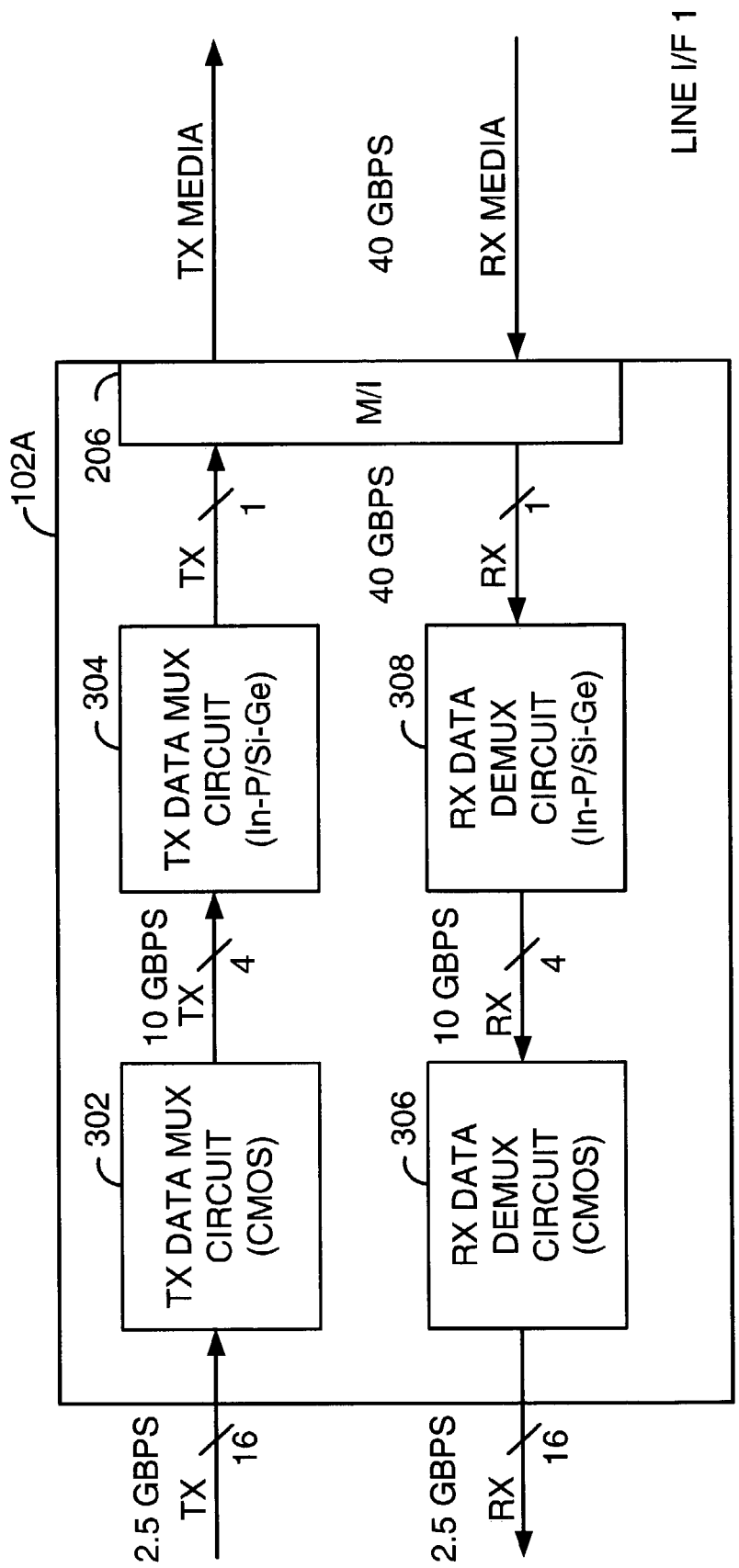
FIG. 3 is a block diagram illustrating another embodiment of a BSIM constructed according to the present invention.

FIG. 3 is a block diagram illustrating another embodiment of a BSIM constructed according to the present invention. The embodiment of FIG. 3 differs from the embodiment of FIG. 2A in that separate TX and RX circuit components are employed. While the media interface 206 of FIG. 3 is shown to be a single device such as shown in FIG. 2B, in other embodiments, the media interface 206 may be formed in separate circuits corresponding to the separate TX and RX paths shown in FIG. 2B.

In the TX path, TX data multiplexing integrated circuit 302 receives a 16 bit wide by 2.5 GBPS nominal bit rate input from a coupled ASIC and produces a 4 bit wide×10 GBPS nominal bit rate TX output. In the embodiment described herein, the TX data multiplexing integrated circuit 302 is constructed in a Silicon CMOS process, for example in a 0.13 micron CMOS process. The TX data multiplexing integrated circuit 302 multiplexes the 16 bit wide by 2.5 GBPS nominal bit rate input to produce a 4 bit wide 10 GBPS nominal bit rate output, which is received by the TX data multiplexing integrated circuit 304. The TX data multiplexing integrated circuit 304 multiplexes the 4 bit wide×10 GBPS nominal bit rate output to produce a single bit wide output at a nominal bit rate of 40 GBPS.

The TX data multiplexing integrated circuit 304 must switch at a frequency that is at least four times the rate at which the TX data multiplexing integrated circuit 302 must switch. For this reason, the TX data multiplexing integrated circuit 304 is constructed in an Indium-Phosphate process or in a Silicon-Germanium process. Each of these processes supports the higher switching rates required at the 40 GBPS output of the TX data multiplexing integrated circuit 304. Thus in combination the TX data multiplexing integrated circuit 302 constructed in a CMOS process and the TX data multiplexing integrated circuit 304 constructed in an Indium-Phosphate or Silicon-Germanium process will provide a high performance relatively low cost solution to the interfacing of a 2.5 GBPS nominal bit rate 16 bit wide interface and a 40 GBPS 1 bit wide interface.

Likewise, in the RX path, the bit stream interface module 102A includes an RX data demultiplexing integrated circuit 308 that receives a single bit stream at a nominal bit rate of 40 GBPS data. The RX data demultiplexing integrated circuit 308 produces a 4 bit wide×10 GBPS nominal bit rate output. The RX data demultiplexing integrated circuit 306 receives the 4 bit wide×10 GBPS nominal bit rate output and produces a 16 bit wide×2.5 GBPS nominal bit rate receive data stream.

As was the case with the TX data multiplexing integrated circuit 302 and the TX data multiplexing integrated circuit 304, the RX data demultiplexing integrated circuit 306 and the RX data demultiplexing integrated circuit 308 are formed in differing process types. In particular the RX data demultiplexing integrated circuit 306 is constructed in a Silicon CMOS process. Further, the RX data demultiplexing integrated circuit 308 is constructed in an Indium-Phosphate or Silicon-Germanium process so that the RX demultiplexer circuit 308 will support the higher switching speeds of the 1 bit wide×40 GBPS interface to the media interface 206.

Figure 4A:
FIG. 4A is a block diagram illustrating a TX data multiplexing integrated circuit constructed according to the present invention.

FIG. 4A is a block diagram illustrating a TX data multiplexing integrated circuit constructed according to the present invention. As shown in FIG. 4A, the TX data multiplexing integrated circuit 302 receives 16 bit steams of data at nominal bit rate of 2.5 GBPS on each bit line from the communication ASIC 104A. Each bit line of this 16 bit wide interface however can operate at bit rates of up to 3.125 GBPS. This interface also includes DSCD Data and a 622 MHz clock. The output of the TX data multiplexing integrated circuit 302 includes 4 bit lines, each of which supports a nominal bit rate of 10 GBPS. However, the output of the TX data multiplexing integrated circuit can produce data at bit rates of between 9.95 GBPS and 12.5 GBPS. The TX data multiplexing integrated circuit 302 also produces a clock signal at one-half the nominal bit rate of the 4 bit stream paths. In such case, when the nominal bit rate of the data paths is 10 GBPS, the clock will be produced at 5 GHz.

Figure 4B:
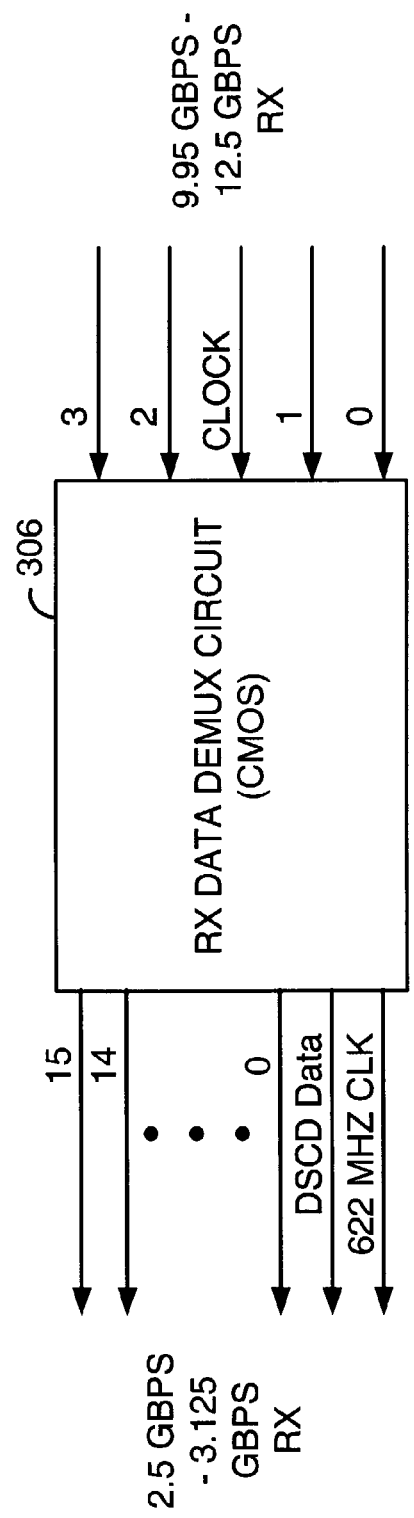
FIG. 4B is a block diagram illustrating an RX data demultiplexing integrated circuit constructed according to the present invention.

FIG. 4B is a block diagram illustrating an RX data demultiplexing integrated circuit 306 constructed according to the present invention. As shown in FIG. 4B, the RX data demultiplexing integrated circuit 306 receives 4 bit streams at nominal bit rates of 10 GBPS each but may operate in the range of 9.95 GBPS to 12.5 GBPS. The RX data demultiplexing integrated circuit 306 also receives a clock signal at one-half the nominal bit rate of the 4 bit stream paths. In such case, when the nominal bit rate of the data paths is 10 GBPS, the clock is received at 5 GHz. The RX data demultiplexing integrated circuit 306 produces 16 bit stream outputs at a nominal bit rate of 2.5 GBPS and DSCD Data. However, the RX data demultiplexing integrated circuit 306 may produce the 16 bit streams output at a bit rate of between 2.5 GBPS and 3.125 GBPS.

Figure 5:
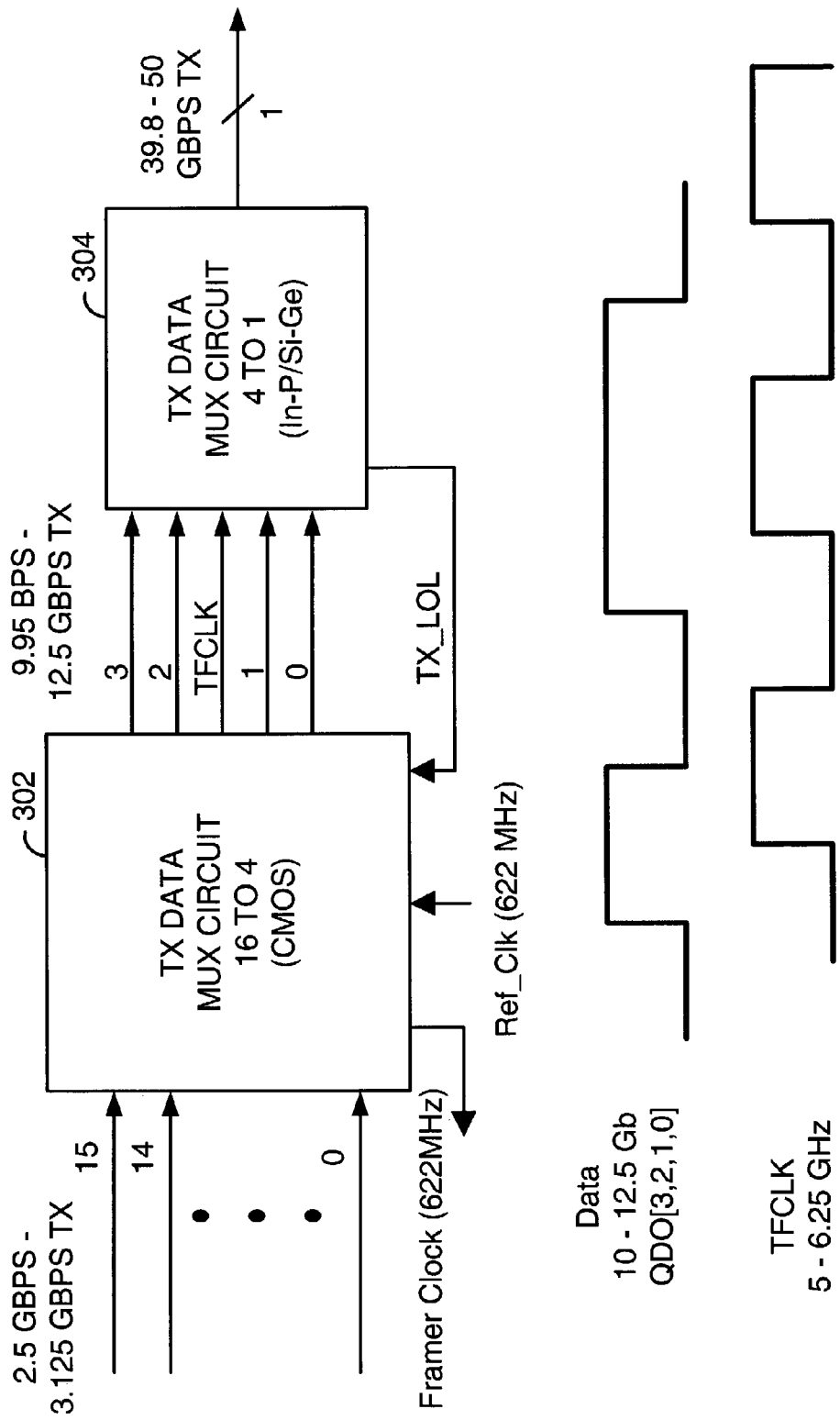
FIG. 5 is a block diagram illustrating the TX data multiplexing integrated circuits of FIG. 3 and the interfaces serviced thereby.

FIG. 5 is a block diagram illustrating the TX data multiplexing integrated circuits 302 and 304 of FIG. 3 and the interfaces serviced thereby. As is shown in FIG. 5, the TX data multiplexing integrated circuit 302 receives 16 bit streams at nominal bit rates of 2.5 GBPS and produces 4 bit streams at nominal bit rates of 10 GBPS. Such operation corresponds to a 16 to 4 multiplexing operation. The TX data multiplexing integrated circuit 302 also produces a framer clock output at 622 MHz, receives a reference clock input at 622 MHz, and also receives a loss of lock signal (TX_LOL) signal from the TX data multiplexing integrated circuit 304.

Further, the TX data multiplexing integrated circuit 304 receives the 4 bit streams at nominal bit rates of 10 GBPS and produces the single bit output at a nominal bit rate of 40 GBPS. However, the TX data multiplexing integrated circuit 304 that performs the 4 to 1 multiplexing may operate at an output rate of between 39.8 GBPS and 50 GBPS. The bit rates indicated herein are provided not to limit the scope of the present invention but only to describe contemplated embodiments for implementing the teachings of the present invention.

The signal transition diagrams of FIG. 5 indicating the data and the TFCLK signal show that the bit rate is twice the rate of the TFCLK signal. In such case, data is latched on the 4 bit×10 GBPS link at each transition of the TFCLK.

Figure 6:
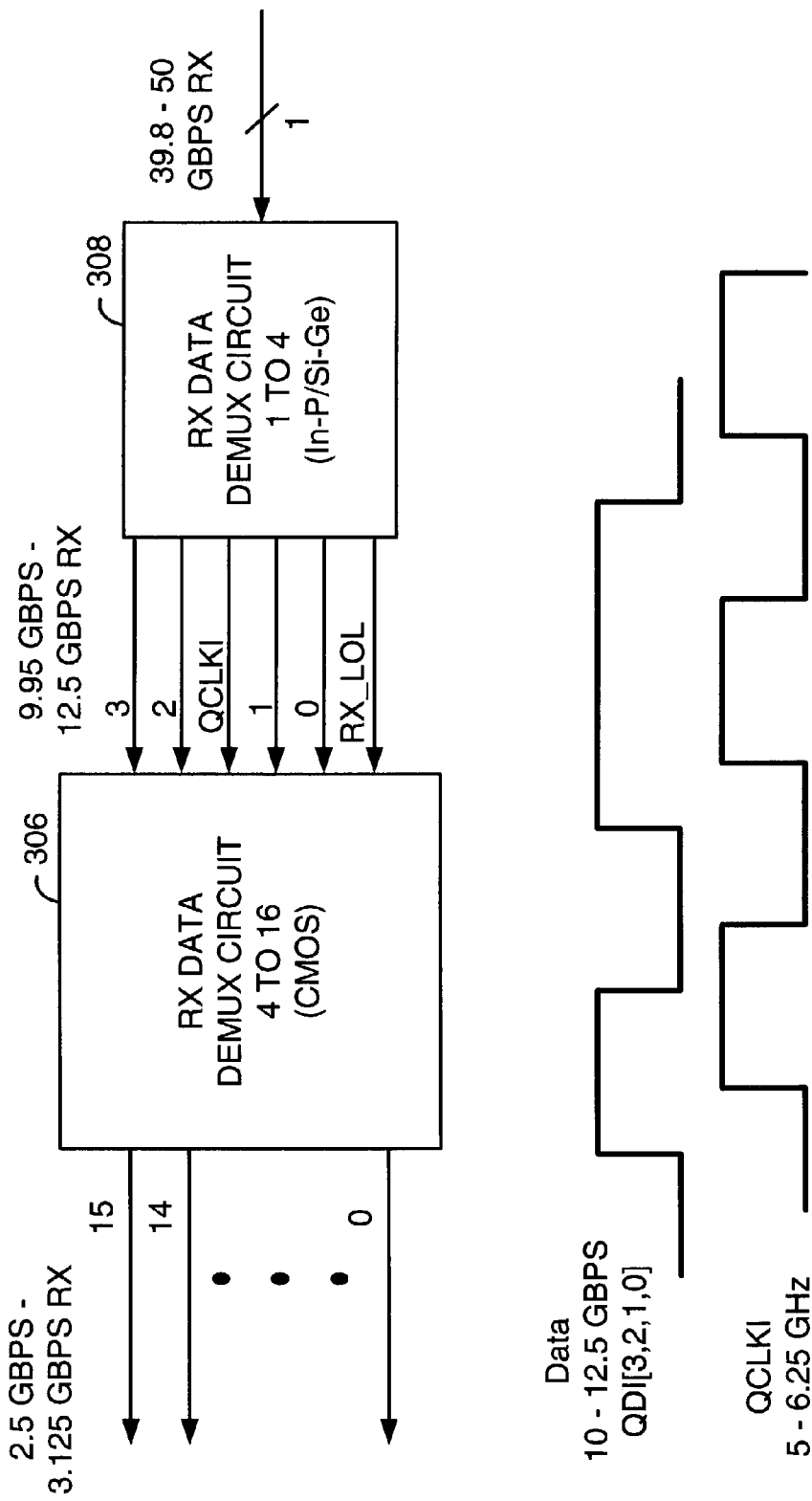
FIG. 6 is a block diagram illustrating the RX data demultiplexing integrated circuits of FIG. 3 and the interfaces serviced thereby.

FIG. 6 is a block diagram illustrating the RX data demultiplexing integrated circuits 306 and 308 of FIG. 3 and the interfaces serviced thereby. As is shown in FIG. 6, the RX data demultiplexing integrated circuit 308 receives a single bit stream at a nominal bit rate of 40 GBPS. However, the single bit stream input may operate at bit rates from between 39.8 GBPS and 50 GBPS. The RX data demultiplexing integrated circuit 308 performs a 1 to 4 demultiplexing operation on the received single bit stream to produce 4 output bit streams at a nominal bit rate of 10 GBPS. However, the RX data demultiplexing integrated circuit 308 may also produce output at bit rates from 9.95 GBPS to 12.5 GBPS.

The RX data demultiplexing integrated circuit 306 receives the 4 bit streams having nominal bit rates of 10 GBPS each and a QCLKI signal and a RX_LOL signal from the RX data demultiplexing integrated circuit 308. Based upon these input signals, the RX data demultiplexing integrated circuit 306 produces the 16 bit stream outputs at nominal bit rates of 2.5 GBPS. Also shown in FIG. 6, the QCLKI signal operates at one-half the frequency of the bit rate of the data stream received from the RX data demultiplexing integrated circuit 308. Thus, in such case, for the nominal bit rate of 10 GBPS, the QCLKI signal will be provided at 5 GHz.

FIG. 7 includes a table and a diagram that illustrate operating specifications for the TX interface between the TX data multiplexing integrated circuits of FIG. 3. FIG. 7 includes the transmitter output and clock specifications 700 and an equivalent circuit 702 upon which these specifications are based. As indicated, the output of the TX data multiplexing integrated circuit 302 is a common mode output. Further, the impedance of the output is 50 ohms single ended and 100 ohms differential. The other properties of the TX data multiplexing integrated circuit 302 output are shown at 700. Further, the equivalent circuit for the interface on the transmit side is indicated at 702.

FIG. 8 includes a table and a diagram that illustrate operating specifications for the RX interface between the RX data demultiplexing integrated circuits of FIG. 3. As shown in FIG. 8, the receiver input parameters are shown at 800 and an equivalent circuit thereupon is shown at 802. As is generally illustrated the receiver input parameters are analogous to the transfer parameters of FIG. 7.

Figure 9A:
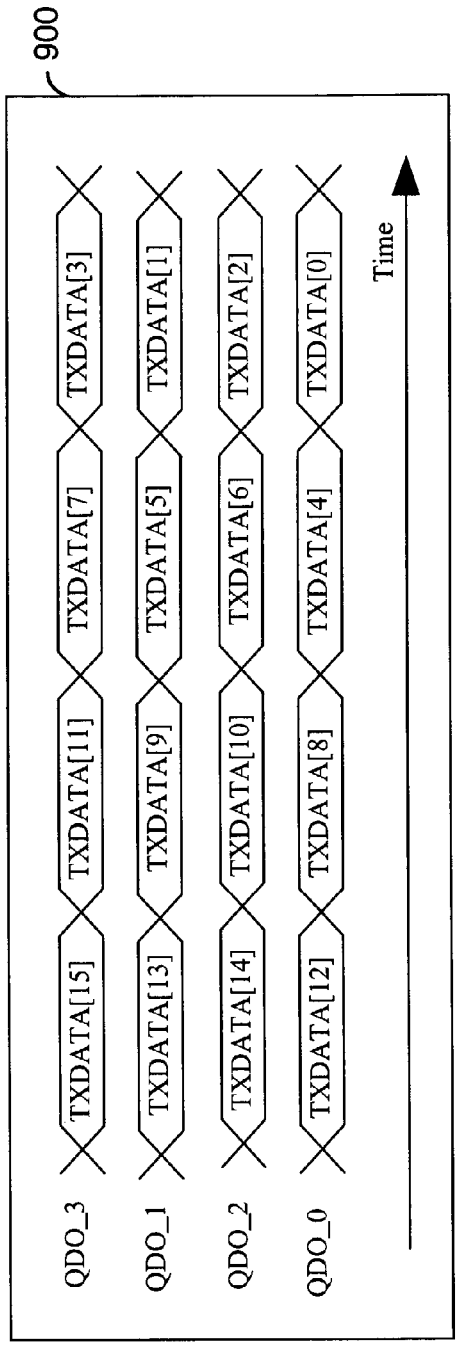
FIG. 9A is a block diagram illustrating the ordering of data blocks on the TX interface between the TX data multiplexing integrated circuits of FIG. 3.

FIG. 9A is a block diagram illustrating the ordering of data blocks on the TX interface between the TX data multiplexing integrated circuits of FIG. 3. As shown in FIG. 9A, the transmit data format 900 is in a natural order. The transmit data format is produced by the TX data multiplexing integrated circuit 302 and provided to the TX data multiplexing integrated circuit 304. This natural data formatting allows the TX data multiplexing integrated circuit to perform its 4 to 1 multiplexing operations such that the single bit stream 40 GBPS output will be provided so that the bits are in their natural order.

Figure 9B:
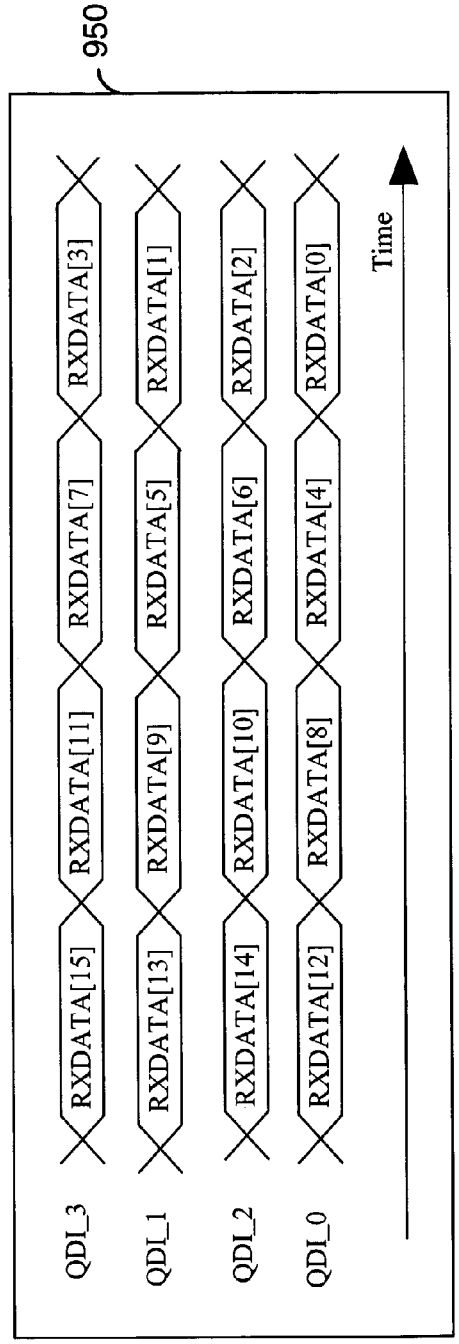
FIG. 9B is a block diagram illustrating the ordering of data blocks on the RX interface between the RX data demultiplexing integrated circuits of FIG. 3.

FIG. 9B is a block diagram illustrating the ordering of data blocks on the RX interface between the RX data demultiplexing integrated circuits of FIG. 3. Likewise, as is shown in FIG. 9B, the received data format 950 is also in a natural order so that when the data is demultiplexed by the RX data demultiplexing integrated circuit 306, the data will be provided on the 16 lines of the 2.5 GBPS interface in a natural order.

Figure 10:
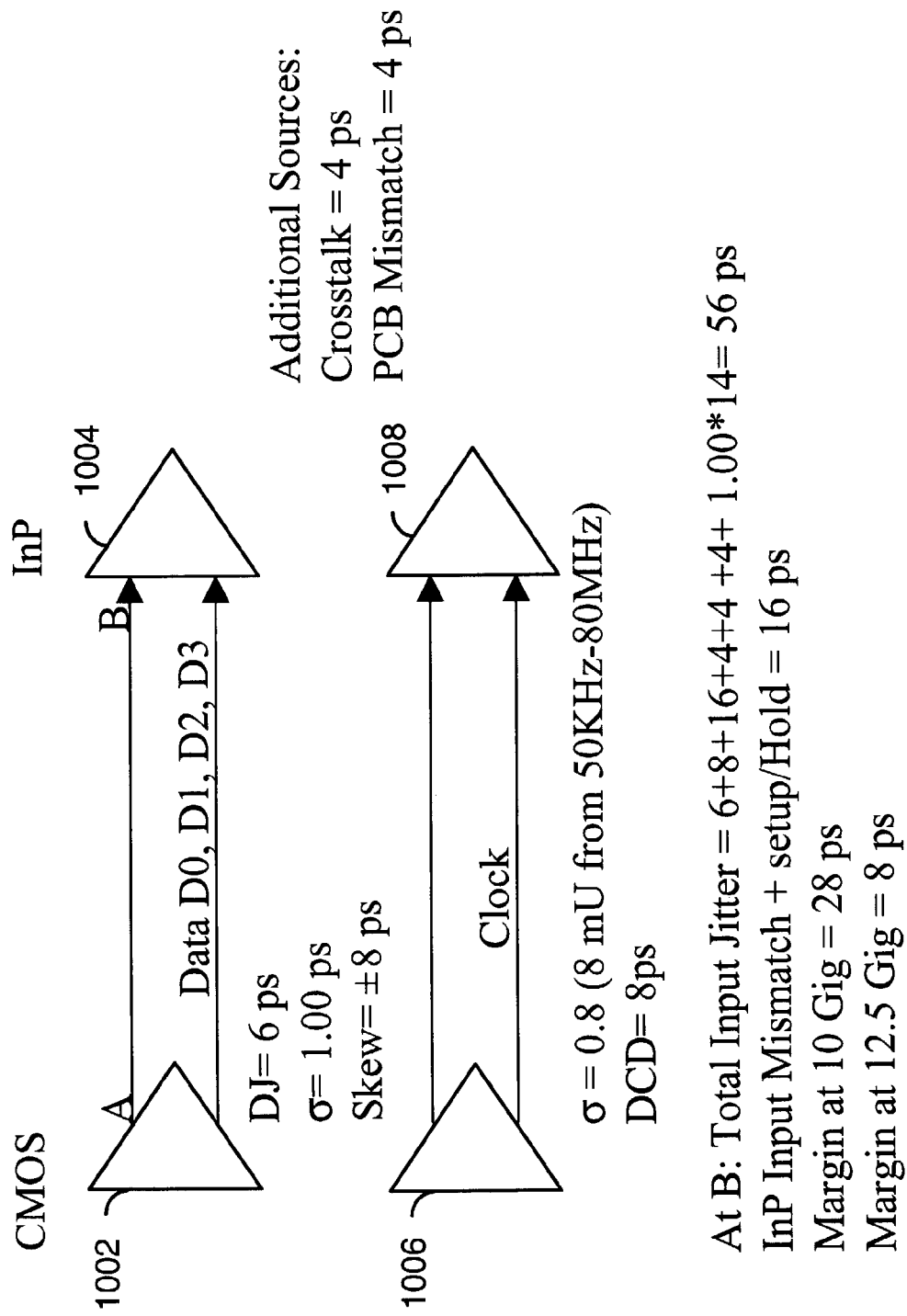
FIG. 10 is a block diagram illustrating the jitter allocation for the TX link between TX data multiplexing integrated circuits of FIG. 3.

FIG. 10 is a block diagram illustrating the jitter allocation for the TX link between TX data multiplexing integrated circuits of FIG. 3. One of four data differential data line drivers 1002 of the TX data multiplexing integrated circuit 302 and a differential clock driver 1006 of the TX data multiplexing integrated circuit 302 on the 4 bit stream 10 GBPS side are shown. FIG. 10 also illustrates one of four data input buffers 1004 of the TX data multiplexing integrated circuit 304 and a clock input buffer 1008 of the TX data multiplexing integrated circuit 3004. As is indicated, deterministic jitter for the data interface is specified as a maximum of 6 picoseconds. Further, the skew in the data lines with respect to the clock is limited to ±8 picoseconds.

Figure 11:
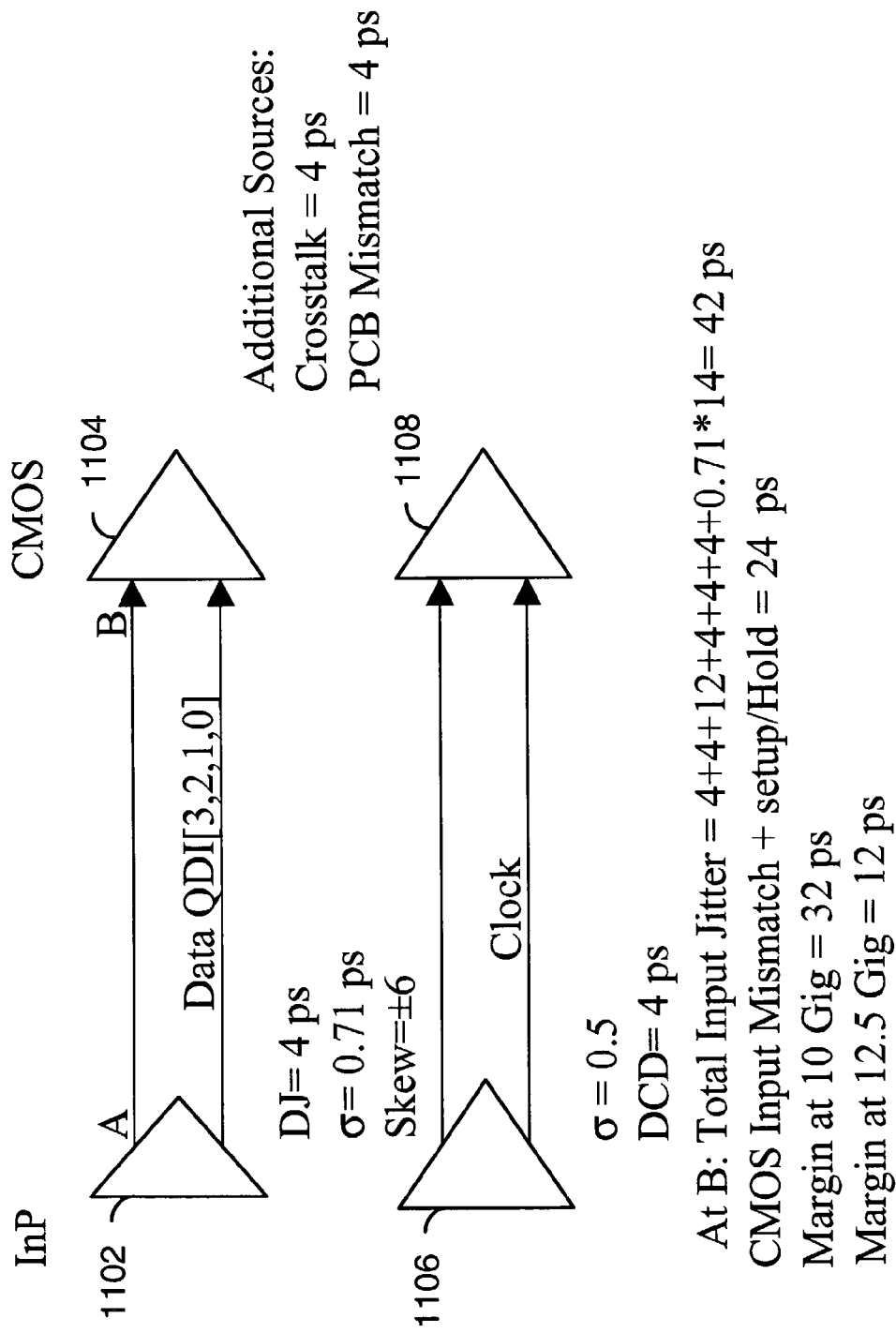
FIG. 11 is a block diagram illustrating the jitter allocation for the RX link between RX data multiplexing integrated circuits of FIG. 3.

FIG. 11 is a block diagram illustrating the jitter allocation for the RX link between RX data demultiplexing integrated circuits of FIG. 3. One of four data differential data line drivers 1102 of the RX data demultiplexing integrated circuit 308 and a differential clock driver 1106 of the RX data demultiplexing integrated circuit 308 on the 4 bit stream 10 GBPS side are shown. FIG. 10 also show one of four data input buffers 1104 of the RX data demultiplexing integrated circuit 306 and a clock input buffer 1108 of the RX data demultiplexing integrated circuit 306. As is indicated, deterministic jitter for the data interface is specified as a maximum of 4 picoseconds. Further, the skew in the data lines with respect to the clock is limited to ±6 picoseconds. The additional information provided in FIG. 11 shows how these jitters may be summed to result at maximum jitters.

Figure 12:
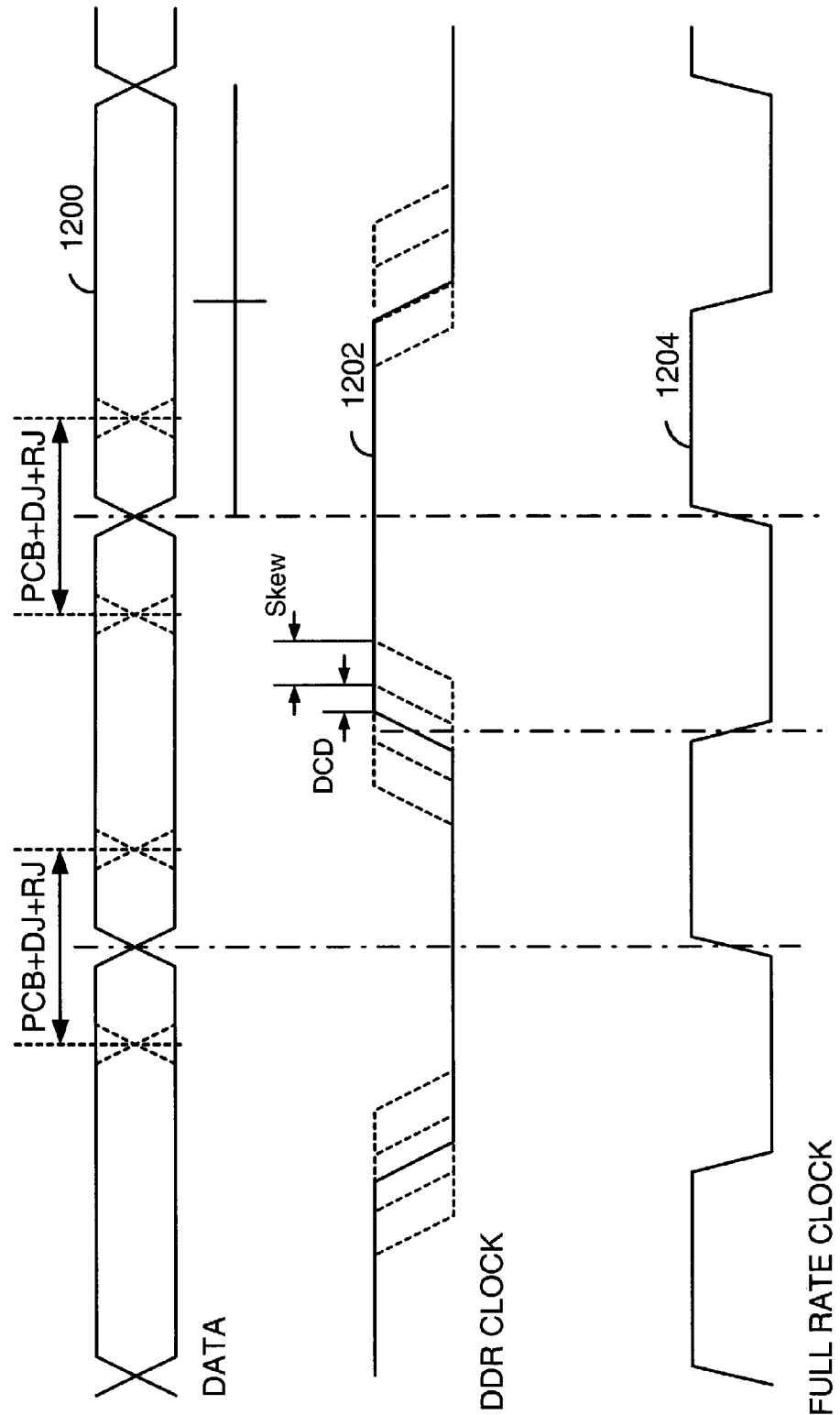
FIG. 12 includes timing diagrams illustrating the set up and hold operations on the 4 bit wide×10 GBPS links between TX data multiplexing integrated circuits and between the RX data demultiplexing integrated circuits of FIG. 3.

FIG. 12 includes timing diagrams illustrating the set up and hold operations on the 4 bit×10 GBPS links between TX data multiplexing integrated circuits and between the RX data demultiplexing integrated circuits of FIG. 3. In particular, the setup and hold specifications for the TX link are shown via graphs 1200 while the setup and hold specifications for the RX link are shown via graphs 1250.

Figure 13:
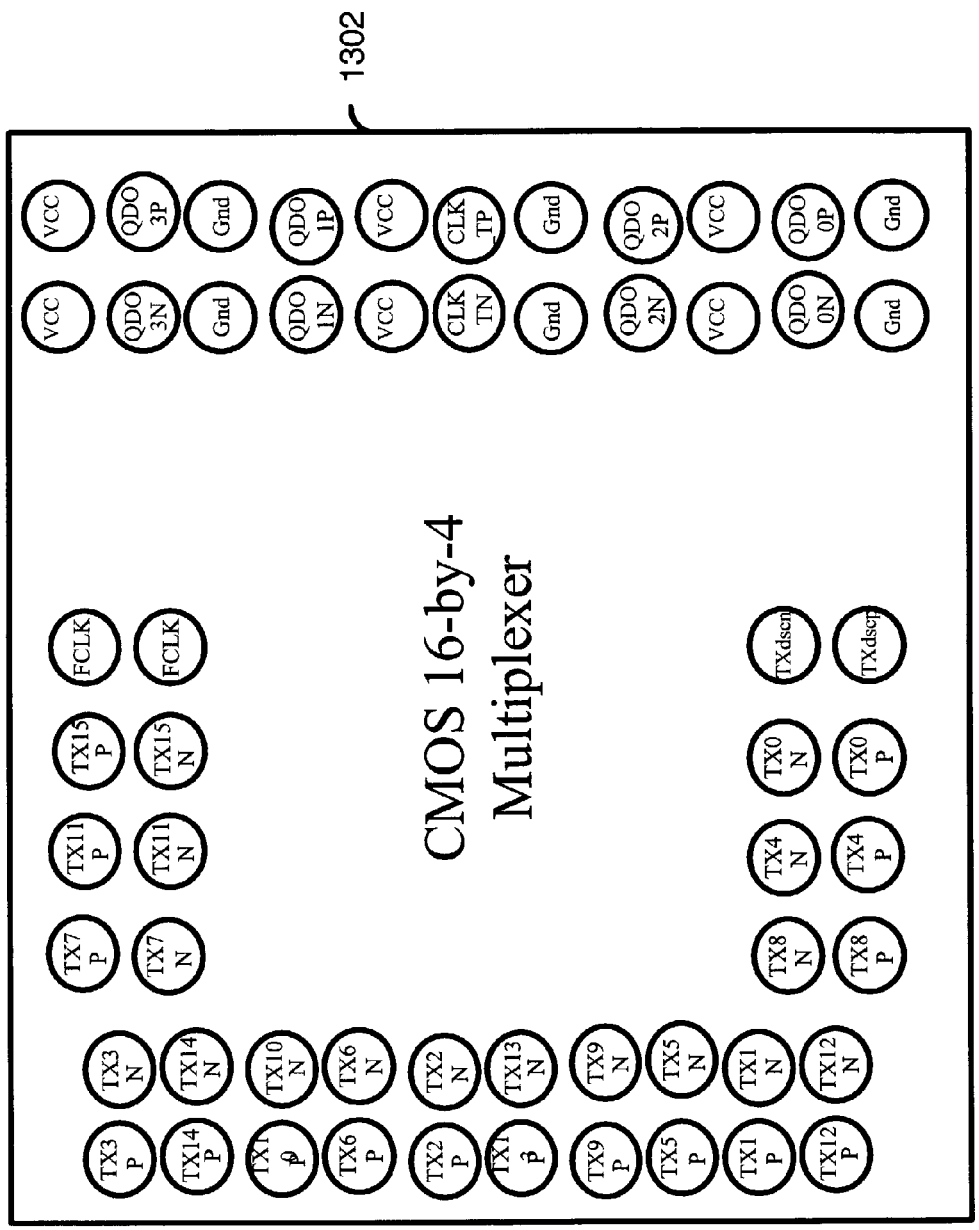
FIG. 13 is a block diagram illustrating the pin-out of the TX data multiplexing integrated circuit 302 of FIG. 3.

FIG. 13 is a block diagram illustrating the pin-out of the TX data multiplexing integrated circuit 302 of FIG. 3. As shown in FIG. 13, the pin-out 1302 of the TX data multiplexing integrated circuit 302 includes the 4 bit×10 GBPS nominal rate differential signals on a first side. As shown, the differential clock is centered on this side to balance the data and clock line. Further, respective ground line shields each of the data lines and the clock lines. The pin-out 1302 also includes the 16 bit stream×2.5 GBPS nominal bit rate lines.

Figure 14:
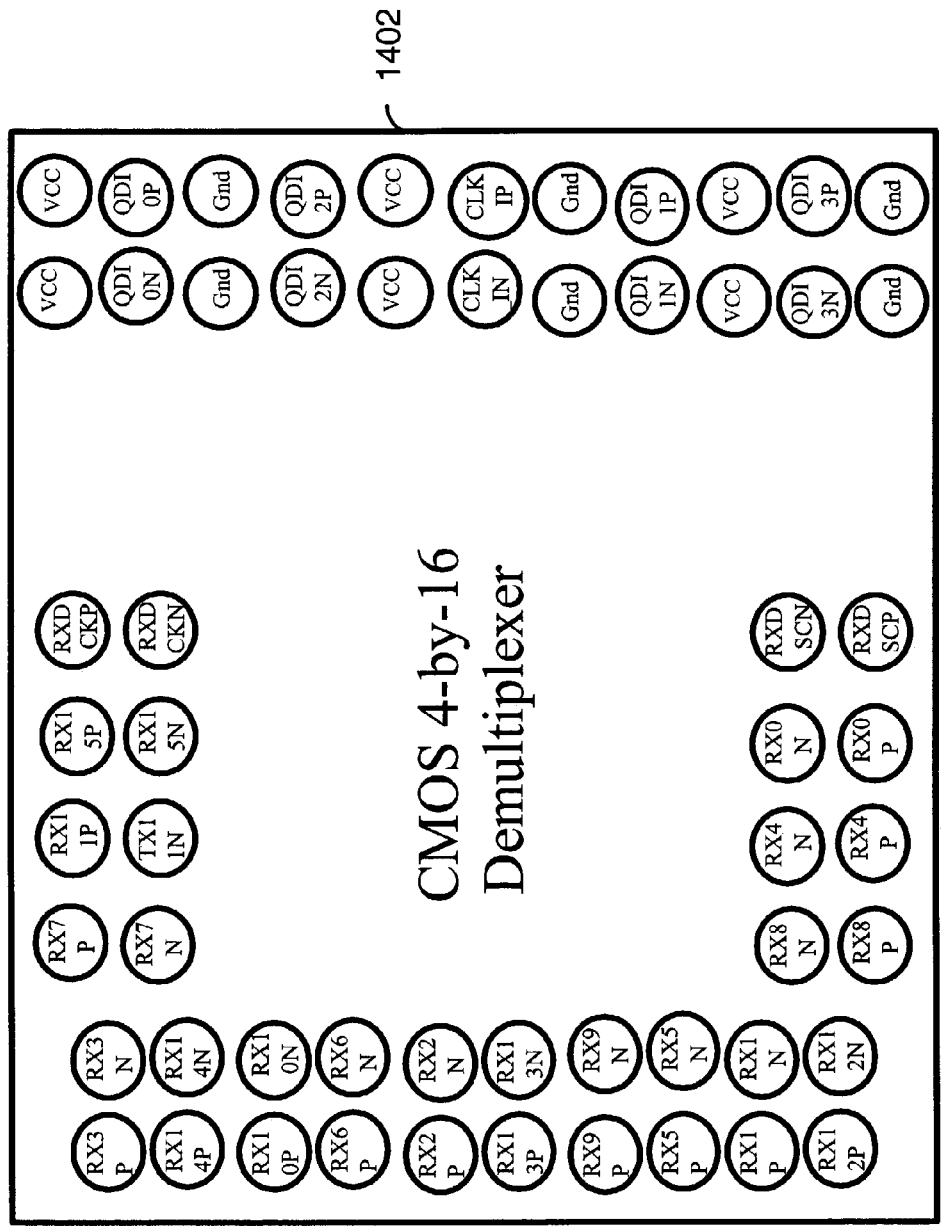
FIG. 14 is a block diagram illustrating the pin-out of the RX data demultiplexing integrated circuit 306 of FIG. 3.

FIG. 14 is a block diagram illustrating the pin-out of the RX data demultiplexing integrated circuit 306 of FIG. 3. As is shown in FIG. 13, the pin-out 1402 for the RX data demultiplexing integrated circuit 306 includes a symmetrically centered clock on the 4 bit stream×10 GBPS bit rate side. Further, the 16 data lines on the 12.5 GBPS nominal bit rate side are distributed in a particular order. As will be described further herein, the particular orders of the signals that may be produced or received by the RX data demultiplexing integrated circuit 306 are switchable.

Figure 15:
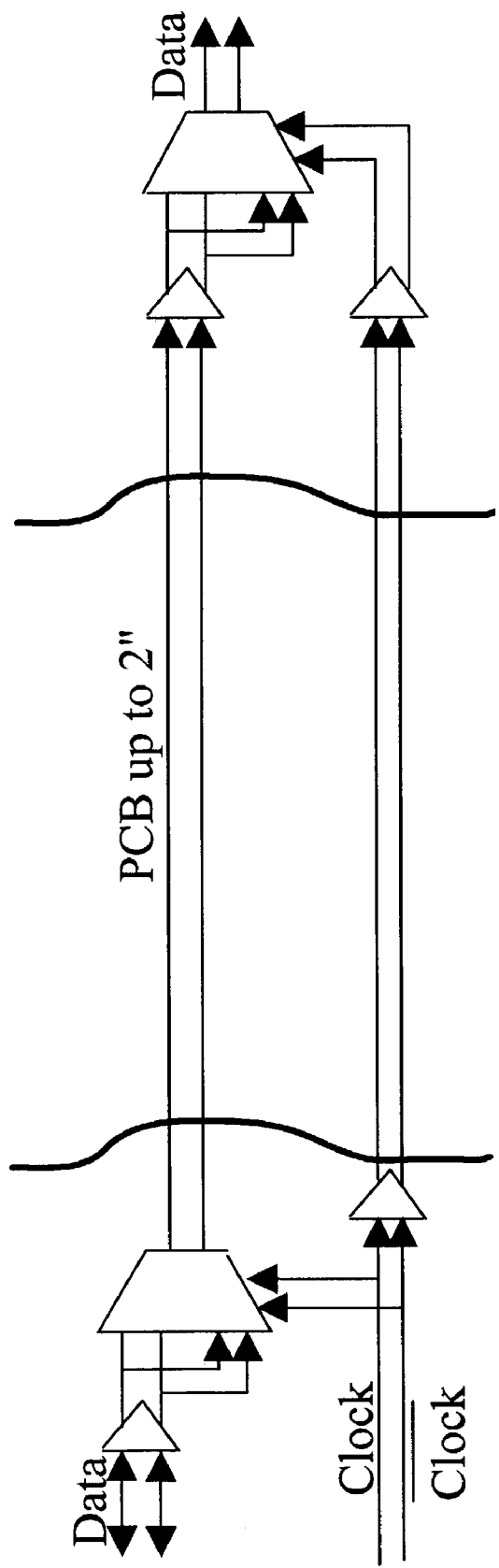
FIG. 15 is a block diagram illustrating a logical implementation for data recovery on the RX and TX links according to the present invention.

FIG. 15 is a block diagram illustrating a logical implementation for data recovery on the RX and TX links according to the present invention. As is illustrated in FIG. 15, a 4 bit 10 GBPS nominal bit rate interface driven by the TX data multiplexing integrated circuit 302 can support up to a 2 inch PCB trace length. Further, as is shown, the data is re-timed with the 5 GHz DDR differential clock just before exiting the TX data multiplexing integrated circuit 302. Further, data at the TX data multiplexing integrated circuit 304 is re-timed upon receipt with the differential 5 GHz DDR clock. The goal in this operation is to keep data and clock symmetrical with minimal skew to minimize the skew between the data lines and between the clock and the data lines on the 4 line 10 GBPS nominal bit rate interface.

Figure 16:
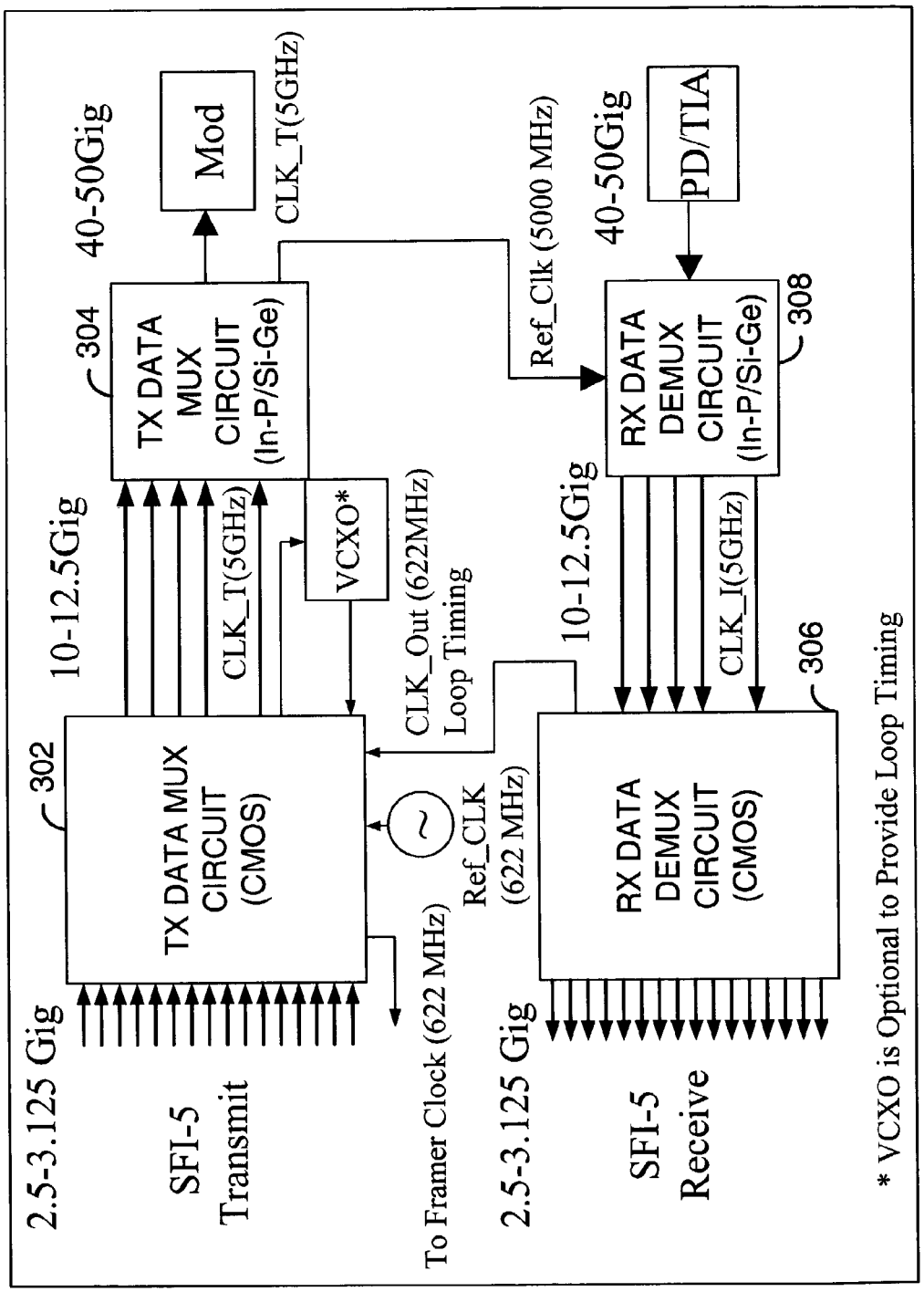
FIG. 16 is a block diagram illustrating a forward clock implementation for TX data multiplexing integrated circuits and RX data demultiplexing integrated circuits of the present invention.

FIG. 16 is a block diagram illustrating a forward clock implementation for TX data multiplexing integrated circuits and RX data demultiplexing integrated circuits of the present invention. As illustrated in FIG. 16, the operation of the TX data multiplexing integrated circuit 302, TX data multiplexing integrated circuit 304, RX data demultiplexing integrated circuit 306, and RX data demultiplexing integrated circuit 308 may operate in a forward clock implementation. This implementation is shown particularly in FIG. 16.

Figure 17:
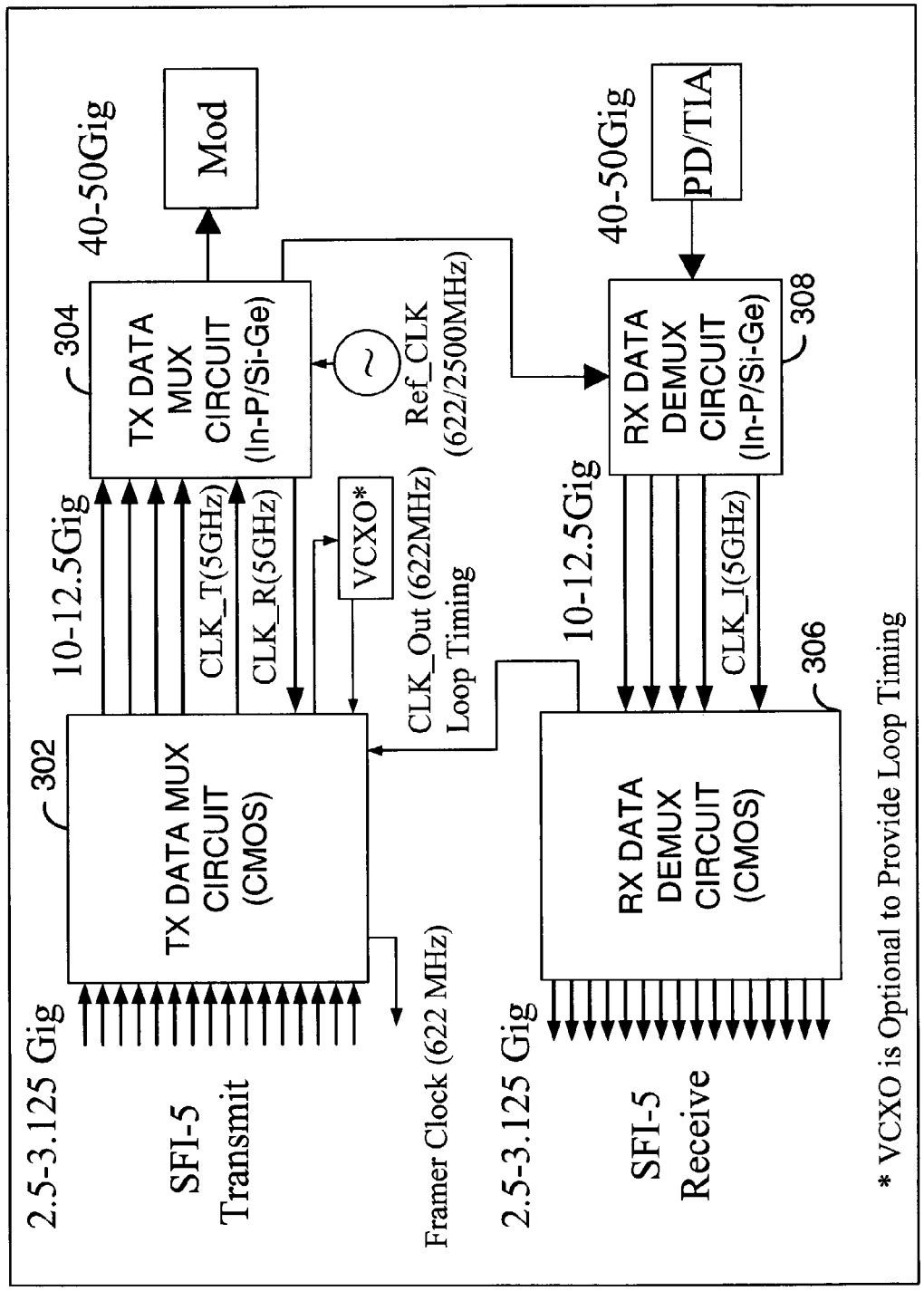
FIG. 17 is a block diagram illustrating a reverse clock implementation for TX data multiplexing integrated circuits and RX data demultiplexing integrated circuits of the present invention.

FIG. 17 is a block diagram illustrating a reverse clock implementation for TX data multiplexing integrated circuits and RX data demultiplexing integrated circuits of the present invention. Referring now to FIG. 17, the TX data multiplexing integrated circuit 302, the TX data multiplexing integrated circuit 304, the RX data demultiplexing integrated circuit 306, and the RX data demultiplexing integrated circuit 308 may also be operated in a reverse clock implementation as shown.

Figure 18A:
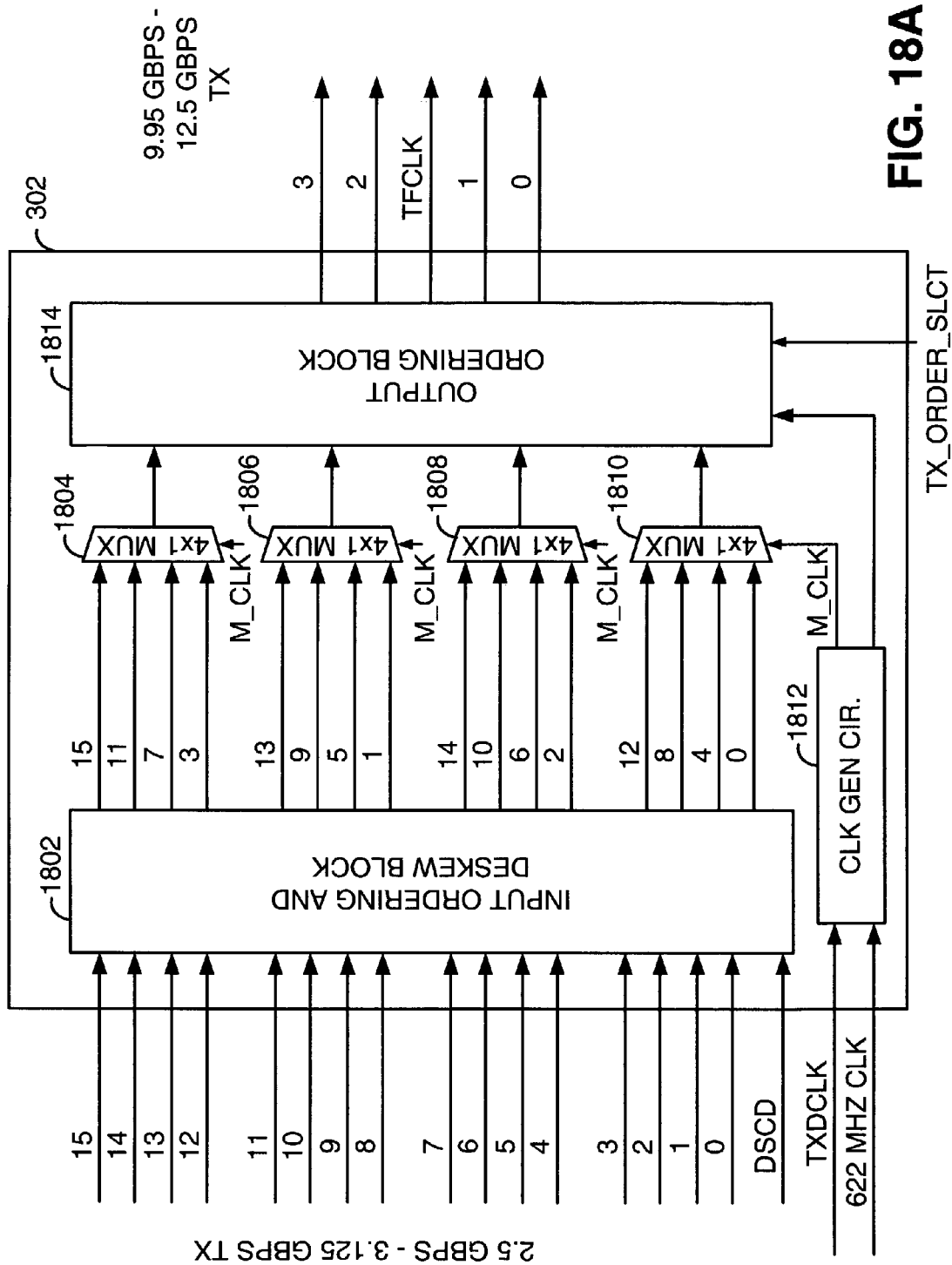
FIG. 18A is a block diagram illustrating a first embodiment of one aspect of the first TX data multiplexing integrated circuit 302 of FIG. 3.

FIG. 18A is a block diagram illustrating a first embodiment of one aspect of the first TX data multiplexing integrated circuit 302 of FIG. 3. The first TX data multiplexing integrated circuit 302 receives 16 bit streams at a nominal bit rate of 2.5 GBPS from a coupled communication ASIC. An input ordering and deskew block 1802 orders and deskews these incoming bit streams into a natural order, as was illustrated in FIG. 9A. A plurality of TX 4×1 multiplexers 1804, 1806, 1808, and 1810 receive the natural order output from the input ordering and deskew block 1802 in the order indicated and, based upon the M_CLK signal received from the clock generating circuit 1812, multiplex the input to produce a four bit stream output. The four bit stream output is received by the output ordering block 1814 that produces the four bit streams and the TFCLK of the multiple bit stream interface that interfaces the first TX data multiplexing integrated circuit 302 and the second TX data multiplexing integrated circuit 304 at the nominal bit rate of 10 GBPS. The output ordering block 1814 orders the output bits based upon the TX_ORDER_SLCT signal and outputs the ordered four bit streams of the multiple bit stream interface that are coupled by the four bit stream interface to the second TX data multiplexing integrated circuit 304.

Figure 18B:
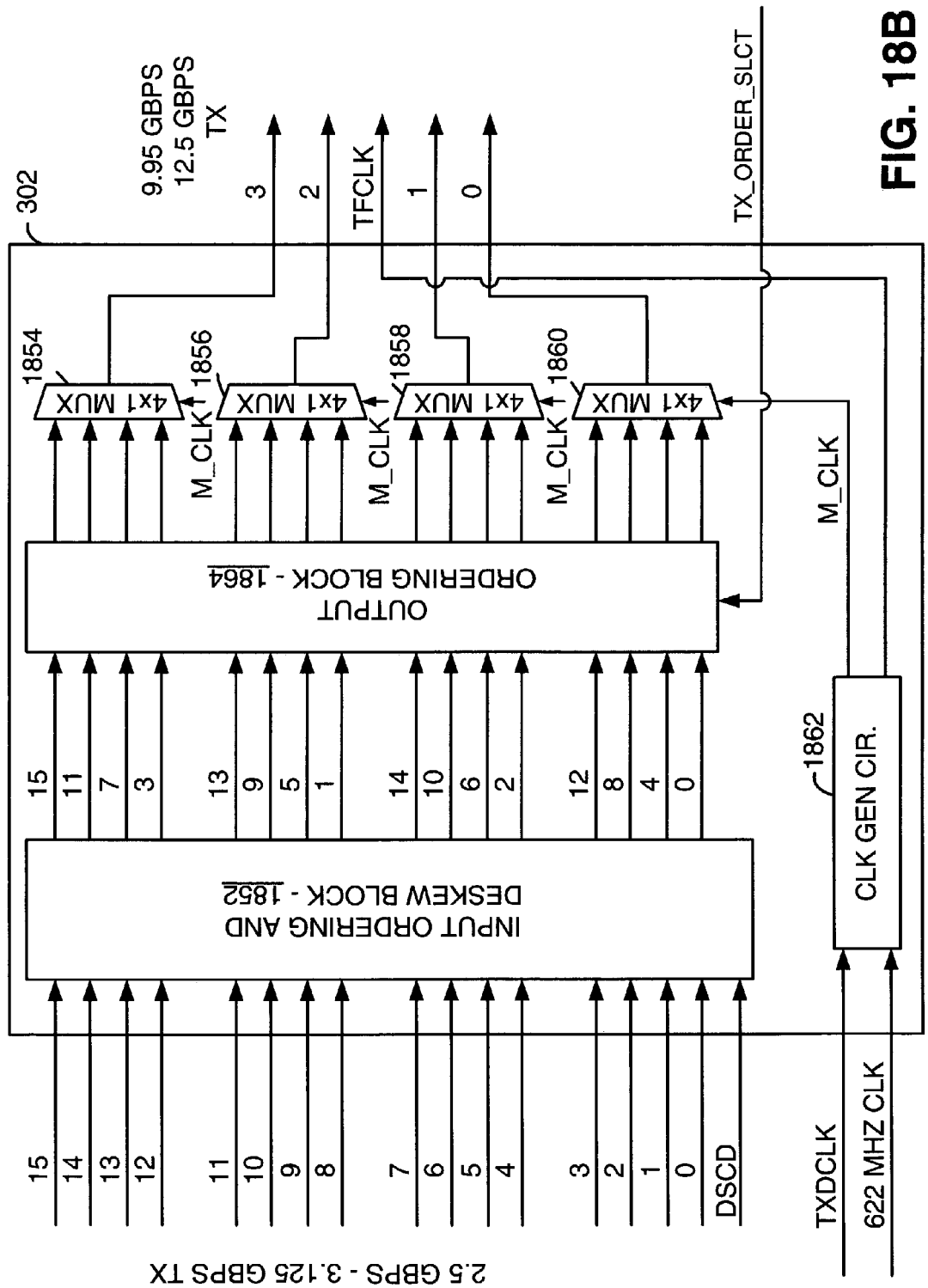
FIG. 18B is a block diagram illustrating a second embodiment of one aspect of the first TX data multiplexing integrated circuit 302 of FIG. 3.

FIG. 18B is a block diagram illustrating a second embodiment of one aspect of the first TX data multiplexing integrated circuit 302 of FIG. 3. The first TX data multiplexing integrated circuit 302 receives 16 bit streams at a nominal bit rate of 2.5 GBPS from a coupled communication ASIC. An input ordering and deskew block 1852 orders and deskews these incoming bit streams. The output of the input ordering and deskew block 1852 is received by the output ordering block 1864, which orders the sixteen data streams based upon the TX_ORDER_SLCT signal. The output of the output ordering block 1864 is received by a plurality of TX 4×1 multiplexers 1854, 1856, 1858, and 1860 and, based upon the M_CLK signal received from the clock generating circuit 1862, multiplexes the sixteen bit streams to produce a four bit stream output as shown.

Figure 19A:
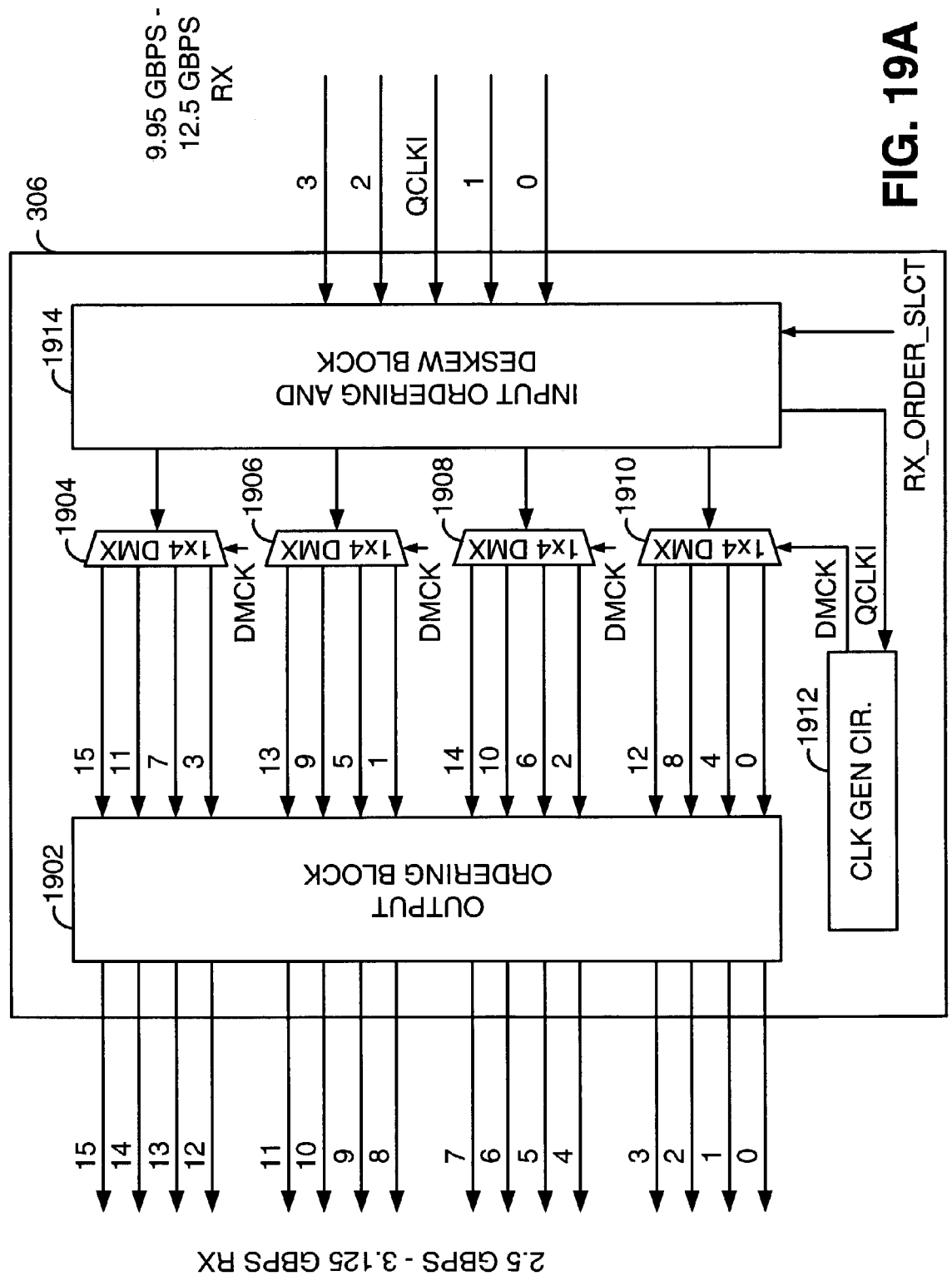
FIG. 19A is a block diagram illustrating a first embodiment of one aspect of the RX data demultiplexing integrated circuit 306 of FIG. 3.

FIG. 19A is a block diagram illustrating a first embodiment of one aspect of the RX data demultiplexing integrated circuit 306 of FIG. 3. The first RX data multiplexing integrated circuit 306 receives four bit streams and the QCLKI of a multiple bit stream interface from the second RX data multiplexing integrated circuit 308. An input ordering and deskew block 1914 deskews and orders these incoming bit streams into a natural order, as was illustrated in FIG. 9A to RX 4×1 demultiplexers 1904, 1906, 1908, and 1910. Based upon a DMCK produced by the clock generation circuit 1912, the 1×4 demultiplexers 1904, 1906, 1908, and 1910 demultiplex the four bit streams to produce 16 bit streams to output ordering block 1902 in the natural order. The output ordering block 1902 receives the 16 bit streams and orders the 16 bit streams to produce 16 bit streams at a nominal bit rate of 2.5 GBPS to a coupled communication ASIC.

Figure 19B:
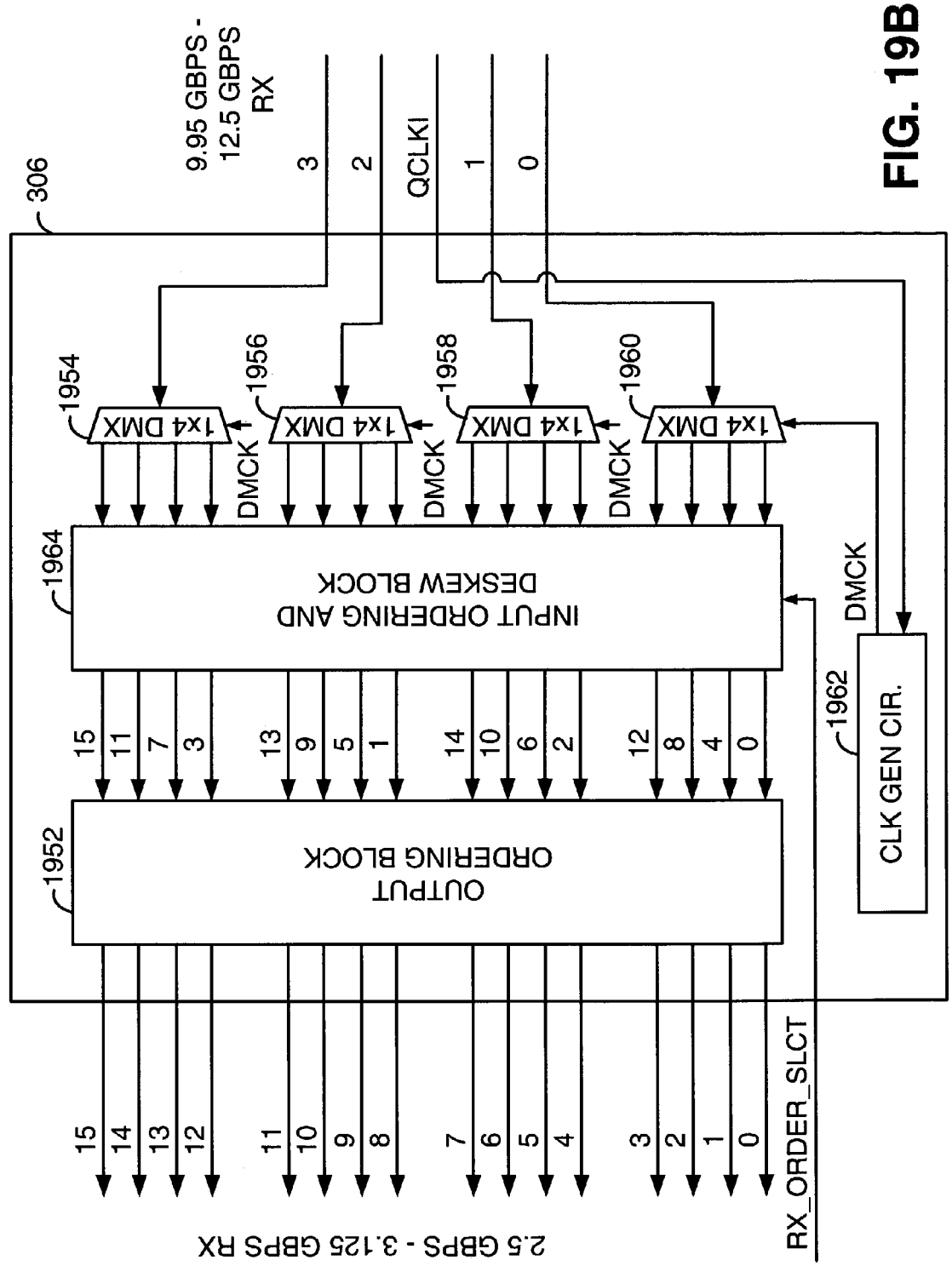
FIG. 19B is a block diagram illustrating a second embodiment of one aspect of the RX data demultiplexing integrated circuit 306 of FIG. 3.

FIG. 19B is a block diagram illustrating a second embodiment of one aspect of the RX data demultiplexing integrated circuit 306 of FIG. 3. The first RX data multiplexing integrated circuit 306 receives four bit streams and the QCLKI of a multiple bit stream interface from the second RX data multiplexing integrated circuit 308. A plurality of RX 4×1 demultiplexers 1954, 1956, 1958, and 1960 demultiplex the four bit streams based upon a DMCK produced by clock generation circuit 1962 to produce 16 bit streams to input ordering and deskew block 1964. Input ordering and deskew block 1964 deskews and orders these incoming bit streams into a natural order, as was illustrated in FIG. 9A. The output of the input ordering and deskew block 1964 is received by output ordering block 1952 that orders the 16 bit streams to produce 16 bit streams at a nominal bit rate of 2.5 GBPS to a coupled communication ASIC.

Figure 20:
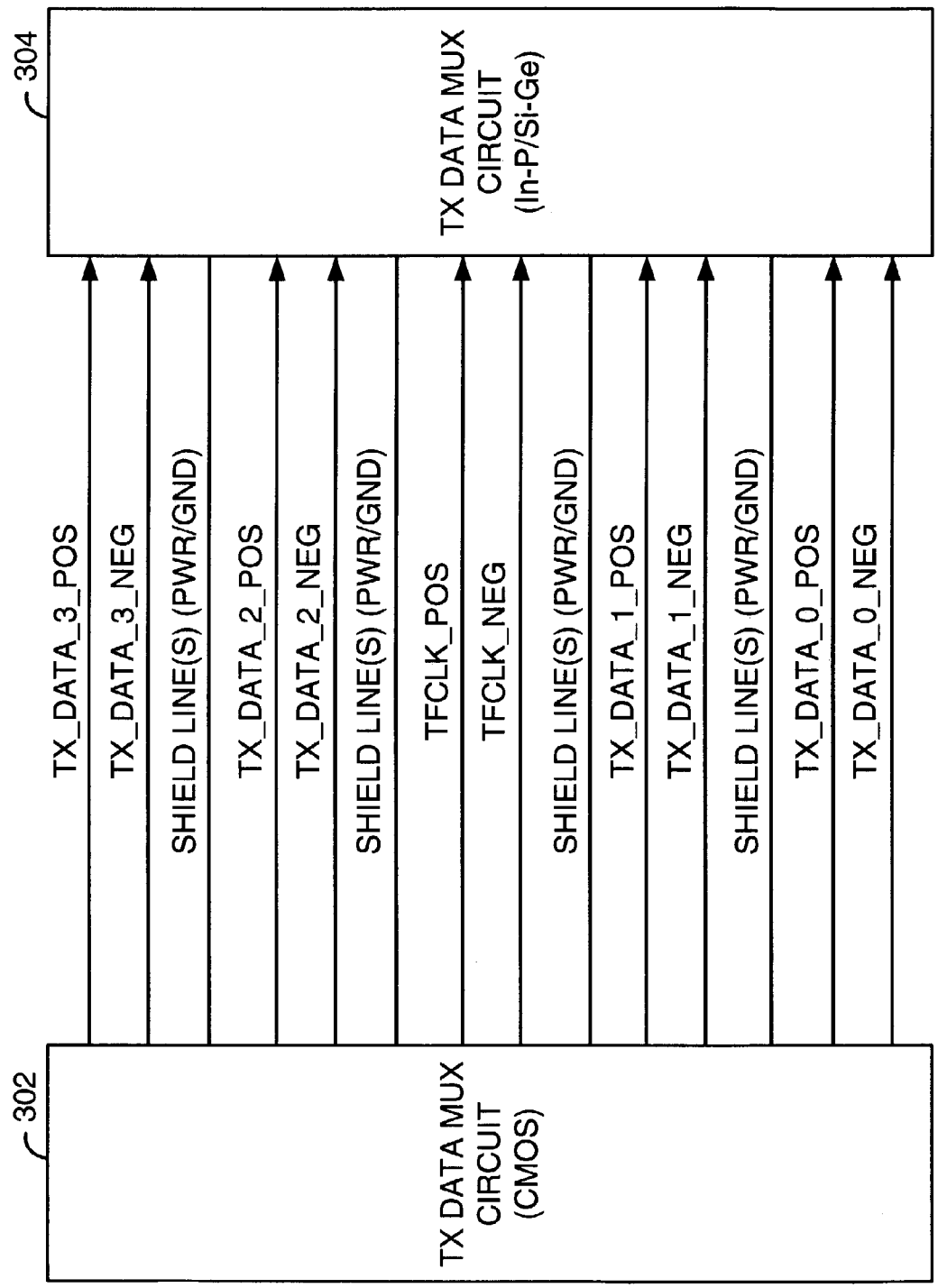
FIG. 20 is a block diagram illustrating a multiple bit stream interface between the TX data multiplexing integrated circuit 302 and the TX data multiplexing integrated circuit 304 of FIG. 3.

FIG. 20 is a block diagram illustrating a multiple bit stream interface between the TX data multiplexing integrated circuit 302 and the TX data multiplexing integrated circuit 304 of FIG. 3. The multiple bit stream interface includes four differential bit streams. A first differential bit stream is indicated by TX_DATA_0_POS and TX_DATA_0_NEG. A second differential bit stream is indicated by TX_DATA_1_POS and TX_DATA_1_NEG. A third differential bit stream is indicated by TX_DATA_2_POS and TX_DATA_2_NEG. A fourth differential bit stream is indicated by TX_DATA_3_POS and TX_DATA_3_NEG. The natural ordering of the bits of the four bit streams of the interface is indicated in FIG. 9A. A differential source centered TFCLK (as shown in FIG. 5) is carried on lines that are centrally located with respect to the lines that carry the differential bit streams. Further, shielding lines, such as grounds and voltages may serve to shield the data lines and the clocks from one another.

Figure 21:
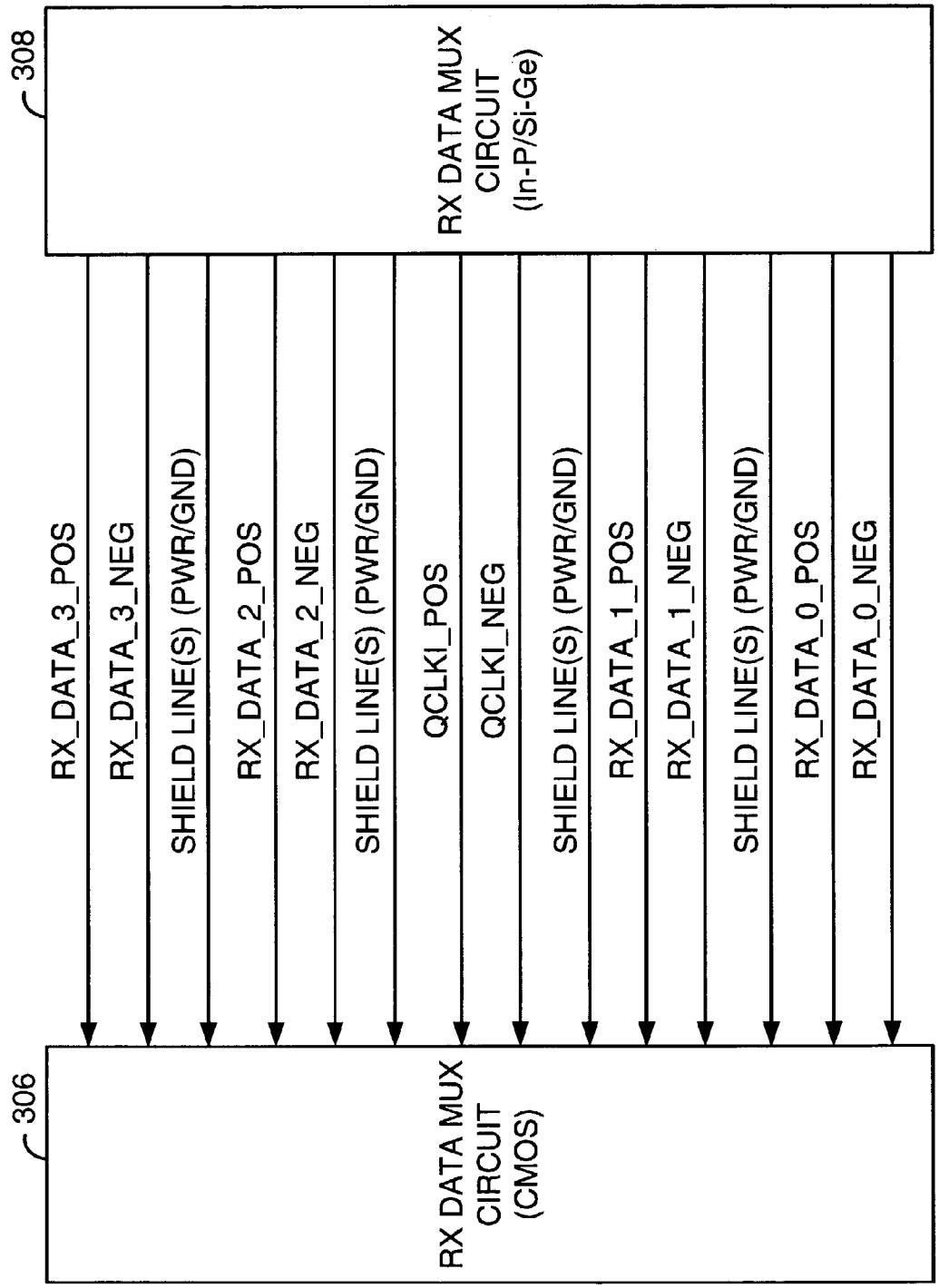
FIG. 21 is a block diagram illustrating a multiple bit stream interface between the RX data demultiplexing integrated circuit 308 and the RX data multiplexing integrated circuit 306 of FIG. 3.

FIG. 21 is a block diagram illustrating a multiple bit stream interface between the RX data demultiplexing integrated circuit 308 and the RX data multiplexing integrated circuit 306 of FIG. 3. The multiple bit stream interface includes four differential bit streams. A first differential bit stream is indicated by RX_DATA_0_POS and RX_DATA_0_NEG. A second differential bit stream is indicated by RX_DATA_1_POS and RX_DATA_1_NEG. A third differential bit stream is indicated by RX_DATA_2_POS and RX_DATA_2_NEG. A fourth differential bit stream is indicated by RX_DATA_3_POS and RX_DATA_3_NEG. The natural ordering of the bits of the four bit streams of the interface are indicated in FIG. 9B. A differential source centered QCLKI (as shown in FIG. 6) is carried on lines that are centrally located with respect to the lines that carry the differential bit streams. Further, shielding lines, such as grounds and voltages may serve to shield the data lines and the clocks from one another.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A multiple bit stream interface that interfaces a first transmit data multiplexing integrated circuit and a second transmit data multiplexing integrated circuit, the multiple bit stream interface comprising:
    an interface plurality of transmit bit streams each of which carries a respective bit stream at an interface bit rate;
    a transmit data clock operating at a frequency corresponding to one-half of the interface bit rate;
    wherein the first transmit data multiplexing integrated circuit receives a first plurality of transmit bit streams from a communication Application Specific Integrated Circuit (ASIC) at a first bit rate;
    wherein the second transmit data multiplexing integrated circuit produces a single bit stream output at a line bit rate;
    wherein the interface plurality of transmit bit streams is divided into a first group and a second group, wherein the first group is carried on first group of lines and the second group is carried on a second group of lines; and
    wherein the transmit data clock is carried on a line that is centered with respect to the first group of lines and the second group of lines such that it resides between the first group of lines and the second group of lines to minimize skew between the transmit data clock and each of the first group of lines and the second group of lines.

2. The multiple bit stream interface of claim 1, wherein: the first plurality of transmit bit streams includes sixteen bit streams; and the interface plurality of transmit bit streams includes four bit streams.

3. The multiple bit stream interface of claim 1, wherein: the first bit rate is nominally 2.5 Giga Bits per Second (GBPS); and the interface bit rate is nominally 10 GBPS; and the line bit rate is nominally 40 GBPS.

4. The multiple bit stream interface of claim 1, wherein the second transmit data multiplexing integrated circuit produces the single bit stream to a communicatively coupled fiber optic media.

5. The multiple bit stream interface of claim 1, further comprising a Printed Circuit Board (PCB) upon which the a first transmit data multiplexing integrated circuit, the second transmit data multiplexing integrated circuit, the interface plurality of transmit bit streams, and the transmit data clock reside.

6. The multiple bit stream interface of claim 1, wherein:
the first transmit data multiplexing integrated circuit comprises a silicon Complementary Metal Oxide Semiconductor (CMOS) based integrated circuit; and the second transmit data multiplexing integrated circuit comprises one of an Indium-Phosphate based integrated circuit or a Silicon-Germanium based integrated circuit.

7. The multiple bit stream interface of claim 1, wherein:
each of the interface plurality of transmit bit streams includes substantially synchronized transition times and substantially synchronized valid data times;
the transmit data clock transitions from low to high during a substantially synchronized valid data time of the plurality of transmit bit streams; and
the transmit data clock transitions from high to low during an immediately following substantially synchronized valid data time.

8. The multiple bit stream interface of claim 1, wherein the single bit stream output at the line bit rate conforms to the OC-768 operating standard.

9. The multiple bit stream interface of claim 1, wherein the single bit stream output at the line bit rate conforms to the SEL-768 operating standard.

10. The multiple bit stream interface of claim 1, wherein the first plurality of transmit bit streams at the first bit rate conforms to the SFI-5 operating standard.

11. The multiple bit stream interface of claim 1, further comprising a loss of lock signal that is asserted by the second transmit data multiplexing integrated circuit to the first transmit data multiplexing integrated circuit when the second transmit data multiplexing integrated circuit loses lock.

12. The multiple bit stream interface of claim 11, wherein:
the first transmit data multiplexing integrated circuit is the master of the multiple bit stream interface when the loss of lock signal is not asserted; and
the second transmit data multiplexing integrated circuit is the master of the multiple bit stream interface when the loss of lock signal is asserted.

13. The multiple bit stream interface of claim 1:
wherein the transmit data clock is provided by the first transmit data multiplexing integrated circuit; and
further comprising a second transmit data clock provided by the second data multiplexing integrated circuit that operates at a frequency corresponding to one-half of the interface bit rate.

14. The multiple bit stream interface of claim 13, wherein:
the transmit data clock has a nominal frequency of 5 GHz; and the interface bit rate is 10 Giga Bits per Second (GBPS).

15. A multiple bit stream interface that interfaces a first receive data demultiplexing integrated circuit and a second receive data demultiplexing integrated circuit, the multiple bit stream interface comprising:
an interface plurality of receive bit streams each of which carries a respective bit stream at an interface bit rate;
a receive data clock operating at a frequency corresponding to one-half of the interface bit rate;
wherein the first receive data demultiplexing integrated circuit produces a first plurality of receive bit streams at a first bit rate;
wherein the second receive data demultiplexing integrated circuit receives a single bit stream input at a line bit rate;
wherein the interface plurality of receive bit streams is divided into a first group and a second group, wherein the first group is carried on first group of lines and the second group is carried on a second group of lines; and
wherein the receive data clock is carried on a line that is centered with respect to the first group of lines and the second group of lines such that it resides between the first group of lines and the second group of lines to minimize skew between the receive data clock and the first group of lines, and between the receive data clock and the second group of lines.

16. The multiple bit stream interface of claim 15, wherein:
the first plurality of receive bit streams includes sixteen bit streams; and the interface plurality of receive bit streams includes four bit streams.

17. The multiple bit stream interface of claim 15, wherein:
the first bit rate is nominally 2.5 Giga Bits per Second (GBPS); and the interface bit rate is nominally 10 GBPS; and the line bit rate is nominally 40 GBPS.

18. The multiple bit stream interface of claim 15, wherein the second receive data demultiplexing integrated circuit receives the single bit stream from a communicatively coupled fiber optic media.

19. The multiple bit stream interface of claim 15, further comprising a Printed Circuit Board (PCB) upon which the a first receive data demultiplexing integrated circuit, the second receive data demultiplexing integrated circuit, the interface plurality of receive bit streams, and the receive data clock reside.

20. The multiple bit stream interface of claim 15, wherein:
the first receive data demultiplexing integrated circuit comprises a silicon Complementary Metal Oxide Semiconductor (CMOS) based integrated circuit; and
the second receive data demultiplexing integrated circuit comprises one of an Indium-Phosphate based integrated circuit or a Silicon-Germanium based integrated circuit.

21. The multiple bit stream interface of claim 15, wherein:
each of the interface plurality of receive bit streams includes substantially synchronized transition times and substantially synchronized valid data times;
the receive data clock transitions from low to high during a substantially synchronized valid data time of the plurality of receive bit streams; and
the receive data clock transitions from high to low during an immediately following substantially synchronized valid data time.

22. The multiple bit stream interface of claim 15, wherein the single bit stream output at the line bit rate conforms to the OC-768 operating standard.

23. The multiple bit stream interface of claim 15, wherein the single bit stream output at the line bit rate conforms to the SEL-768 operating standard.

24. The multiple bit stream interface of claim 15, wherein the first plurality of receive bit streams at the first bit rate conforms to the SFI-5 operating standard.

25. The multiple bit stream interface of claim 15, further comprising a loss of lock signal that is asserted by the second receive data demultiplexing integrated circuit to the first receive data demultiplexing integrated circuit when the second receive data demultiplexing integrated circuit loses lock.

26. The multiple bit stream interface of claim 15 wherein the receive data clock is provided by the second receive data demultiplexing integrated circuit.

27. The multiple bit stream interface of claim 15, wherein: the receive data clock has a nominal frequency of 5 GHz; and the interface bit rate is 10 Giga Bits per Second (GBPS).

28. A method for interfacing a first transmit data multiplexing integrated circuit and a second transmit data multiplexing integrated circuit, the method comprising:
the first transmit data multiplexing integrated circuit receiving a first plurality of transmit bit streams from a communication Application Specific Integrated Circuit (ASIC) at a first bit rate;
the first transmit data multiplexing integrated circuit multiplexing the first plurality of transmit bit streams into an interface plurality of transmit bit streams at an interface bit rate;
wherein the interface plurality of transmit bit streams is divided into a first group and a second group, wherein the first group is carried on first group of lines and the second group is carried on a second group of lines coupling the first transmit data multiplexing integrated circuit to the second transmit data multiplexing integrated circuit;
wherein an interface between the first transmit data multiplexing integrated circuit to the second transmit data multiplexing integrated circuit includes a transmit data clock operating at a frequency corresponding to one-half of the interface bit rate;
the second transmit data multiplexing integrated circuit receiving the interface plurality of transmit bit streams from the first transmit data multiplexing integrated circuit and producing a single bit stream output at a line bit rate; and
wherein the transmit data clock is carried on a line that is centered with respect to the first group of lines and the second group of lines such that it resides between the first group of lines and the second group of lines to minimize skew between the transmit data clock and the first group of lines, and between the transmit data clock and the second group of lines.

29. The method of claim 28, wherein:
the first plurality of transmit bit streams includes sixteen bit streams; and
the interface plurality of transmit bit streams includes four bit streams.

30. The method of claim 28, wherein:
the first bit rate is nominally 2.5 Giga Bits per Second (GBPS); and
the interface bit rate is nominally 10 GBPS; and the line bit rate is nominally 40 GBPS.

31. The method of claim 28, wherein the second transmit data multiplexing integrated circuit produces the single bit stream to a communicatively coupled fiber optic media.

32. The method of claim 28, wherein:
each of the interface plurality of transmit bit streams includes substantially synchronized transition times and substantially synchronized valid data times;
the transmit data clock transitions from low to high during a substantially synchronized valid data time of the plurality of transmit bit streams; and
the transmit data clock transitions from high to low during an immediately following substantially synchronized valid data time.

33. The method of claim 28, wherein the single bit stream output at the line bit rate conforms to the OC-768 operating standard.

34. The method of claim 28, wherein the single bit stream output at the line bit rate conforms to the SEL-768 operating standard.

35. The method of claim 28, wherein the first plurality of transmit bit streams at the first bit rate conforms to the SFI-5 operating standard.

36. The method of claim 28, further comprising asserting a loss of lock signal by the second transmit data multiplexing integrated circuit to the first transmit data multiplexing integrated circuit when the second transmit data multiplexing integrated circuit loses lock.

37. The method of claim 36, wherein:
the first transmit data multiplexing integrated circuit is the master of the interface when the loss of lock signal is not asserted; and
the second transmit data multiplexing integrated circuit is the master of the interface when the loss of lock signal is asserted.

38. The method of claim 28:
wherein the transmit data clock is provided by the first transmit data multiplexing integrated circuit; and
further comprising providing a second transmit data clock by the second data multiplexing integrated circuit that operates at a frequency corresponding to one-half of the interface bit rate.

39. The method of claim 28, wherein: the transmit data clock has a nominal frequency of 5 GHz; and the interface bit rate is 10 Giga Bits per Second (GBPS).

40. A method for interfacing a first receive data demultiplexing integrated circuit and a second receive data demultiplexing integrated circuit, the method comprising:
receiving by the second receive data demultiplexing integrated circuit a single bit stream input at a line bit rate, wherein the second receive data demultiplexing integrated circuit demultiplexes the single bit stream input to produce an interface plurality of receive bit streams each of which carries a respective bit stream at an interface bit rate;
producing a receive data clock operating at a frequency corresponding to one-half of the interface bit rate;
wherein the first receive data demultiplexing integrated circuit receives the interface plurality of receive bit streams and produces a first plurality of receive bit streams at a first bit rate;
wherein the interface plurality of receive bit streams is divided into a first group and a second group, wherein the first group is carried on first group of lines and the second group is carried on a second group of lines; and
wherein the receive data clock is carried on a line that is centered with respect to the first group of lines and the second group of lines such that it resides between the first group of lines and the second group of lines to minimize skew between the receive data clock and the first group of lines, and between the receive data clock and the second group of lines.

41. The method of claim 40, wherein: the first plurality of receive bit streams includes sixteen bit streams; and the interface plurality of receive bit streams includes four bit streams.

42. The method of claim 40, wherein: the first bit rate is nominally 2.5 Giga Bits per Second (GBPS); and the interface bit rate is nominally 10 GBPS; and the line bit rate is nominally 40 GBPS.

43. The method of claim 40, wherein the second receive data demultiplexing integrated circuit receives the single bit stream from a communicatively coupled fiber optic media.

44. The method of claim 40, wherein: each of the interface plurality of receive bit streams includes substantially synchronized transition times and substantially synchronized valid data times;
- the receive data clock transitions from low to high during a substantially synchronized valid data time of the plurality of receive bit streams; and
- the receive data clock transitions from high to low during an immediately following substantially synchronized valid data time.

45. The method of claim 40, wherein the single bit stream output at the line bit rate conforms to the OC-768 operating standard.

46. The method of claim 40, wherein the single bit stream output at the line bit rate conforms to the SEL-768 operating standard.

47. The method of claim 40, wherein the first plurality of receive bit streams at the first bit rate conforms to the SFI-5 operating standard.

48. The method of claim 40, further comprising:
- generating a loss of lock signal by the second receive data demultiplexing integrated circuit; and
- asserting the loss of lock signal to the first receive data demultiplexing integrated circuit when the second receive data demultiplexing integrated circuit loses lock.

49. The method of claim 40, wherein the receive data clock is produced by the second receive data demultiplexing integrated circuit.

50. The method of claim 40, wherein: the receive data clock has a nominal frequency of 5 GHz; and the interface bit rate is 10 Giga Bits per Second (GBPS).

* * * * *